United States Patent
Sakairi et al.

(10) Patent No.: US 10,866,467 B2
(45) Date of Patent: Dec. 15, 2020

(54) LIQUID CRYSTAL DISPLAY UNIT AND PROJECTION DISPLAY UNIT

(71) Applicants: SONY SEMICONDUCTOR SOLUTIONS CORPORATION, Kanagawa (JP); SONY CORPORATION, Tokyo (JP)

(72) Inventors: Takashi Sakairi, Kanagawa (JP); Koichi Amari, Kanagawa (JP); Keiichi Maeda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/331,381

(22) PCT Filed: Oct. 3, 2017

(86) PCT No.: PCT/JP2017/035946
§ 371 (c)(1),
(2) Date: Mar. 7, 2019

(87) PCT Pub. No.: WO2018/074219
PCT Pub. Date: Apr. 26, 2018

(65) Prior Publication Data
US 2019/0369448 A1 Dec. 5, 2019

(30) Foreign Application Priority Data

Oct. 19, 2016 (JP) .................................. 2016-205218

(51) Int. Cl.
*G02F 1/1343* (2006.01)
*G02F 1/1335* (2006.01)
*G02F 1/13357* (2006.01)

(52) U.S. Cl.
CPC .... *G02F 1/134309* (2013.01); *G02F 1/13439* (2013.01); *G02F 1/133553* (2013.01);
(Continued)

(58) Field of Classification Search
CPC ......... G02F 1/134309; G02F 1/133553; G02F 1/13439
See application file for complete search history.

(56) References Cited

U.S. PATENT DOCUMENTS 6,124,911 A     9/2000  Nakamura et al.
8,243,236 B2 *  8/2012  Hara ................ G02F 1/133553
                                                349/113

(Continued)

FOREIGN PATENT DOCUMENTS

CN    105191501 A    12/2015
JP    2000-111899 A   4/2000
(Continued)

OTHER PUBLICATIONS

International Search Report and Written Opinion of PCT Application No. PCT/JP2017/035946, dated Dec. 26, 2017, 08 pages of ISRWO.

*Primary Examiner* — Dung T Nguyen
(74) *Attorney, Agent, or Firm* — Chip Law Group

(57) ABSTRACT

A liquid crystal display unit of the present disclosure has a liquid crystal panel having a pixel region including a plurality of pixels, and the liquid crystal panel includes: a first substrate on which a plurality of pixel electrodes having light reflectivity are provided for each of the pixels; a second substrate disposed in opposition to the first substrate; a liquid crystal layer disposed between the first substrate and the second substrate; and an interlayer film provided between the first substrate and the liquid crystal layer, and the interlayer film has a plurality of sloped sections each including at least a portion facing a corresponding one of the (Continued)

plurality of pixel electrodes, and the plurality of sloped sections each have a slope width that faces the corresponding one of the plurality of pixel electrodes and that differs from one another.

13 Claims, 17 Drawing Sheets

(52) U.S. Cl.
CPC ............ *G02F 2001/133565* (2013.01); *G02F 2001/133627* (2013.01)

(56) References Cited

U.S. PATENT DOCUMENTS

| | | | | |
|---|---|---|---|---|
| 2001/0043175 | A1* | 11/2001 | Yasukawa | ......... G02F 1/133502 |
| | | | | 345/87 |
| 2005/0205870 | A1* | 9/2005 | Yamazaki | ......... G02F 1/133553 |
| | | | | 257/72 |
| 2016/0021718 | A1* | 1/2016 | Kikuchi | ................. H05B 33/10 |
| | | | | 362/231 |

FOREIGN PATENT DOCUMENTS

| | | | |
|---|---|---|---|
| JP | 2003-161936 | A | 6/2003 |
| KR | 10-0185188 | B1 | 5/1999 |
| KR | 10-2015-0133184 | A | 11/2015 |
| TW | 201442226 | A | 11/2014 |
| WO | 2014/148263 | A1 | 9/2014 |

* cited by examiner

[FIG. 1]
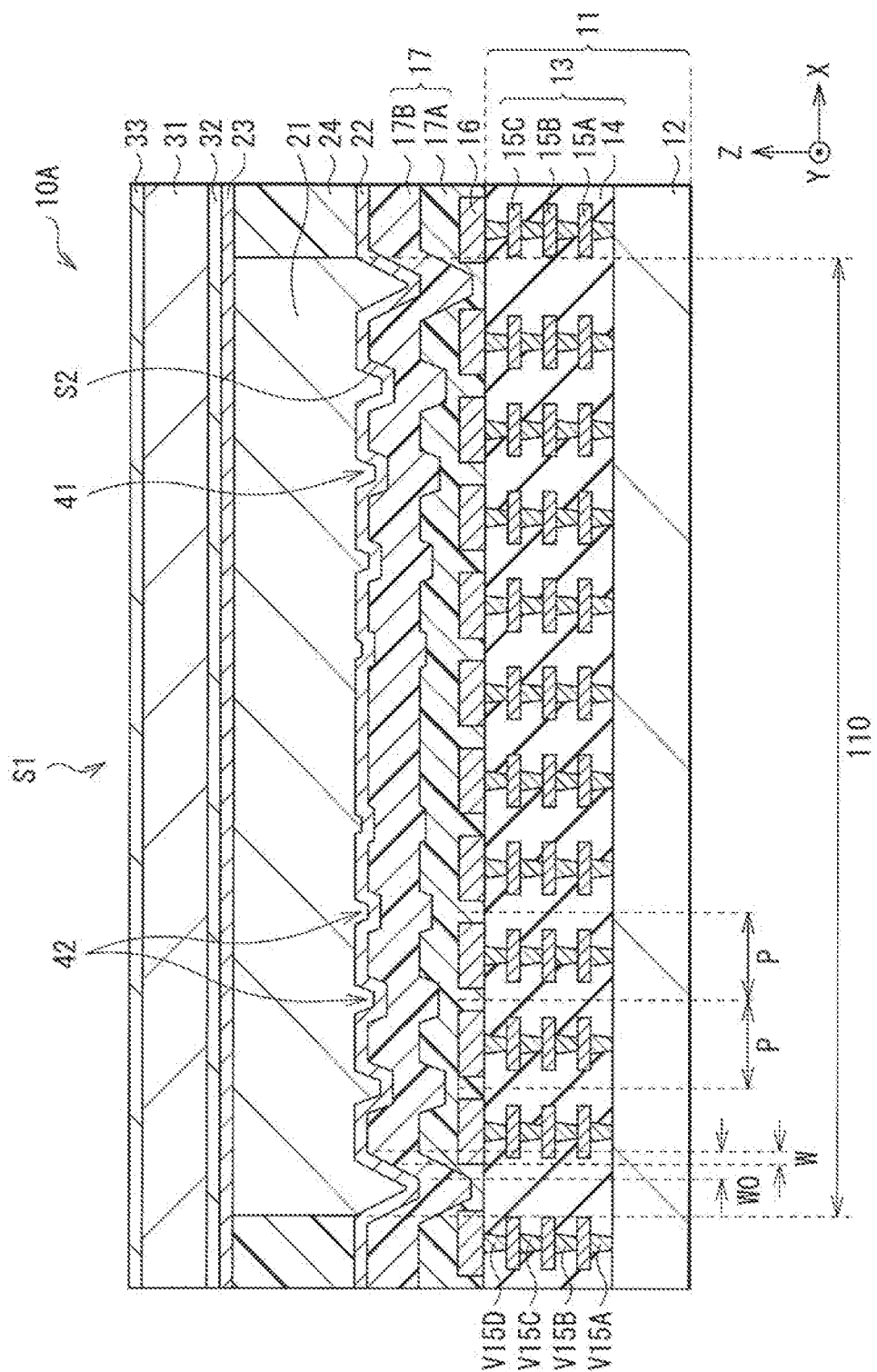

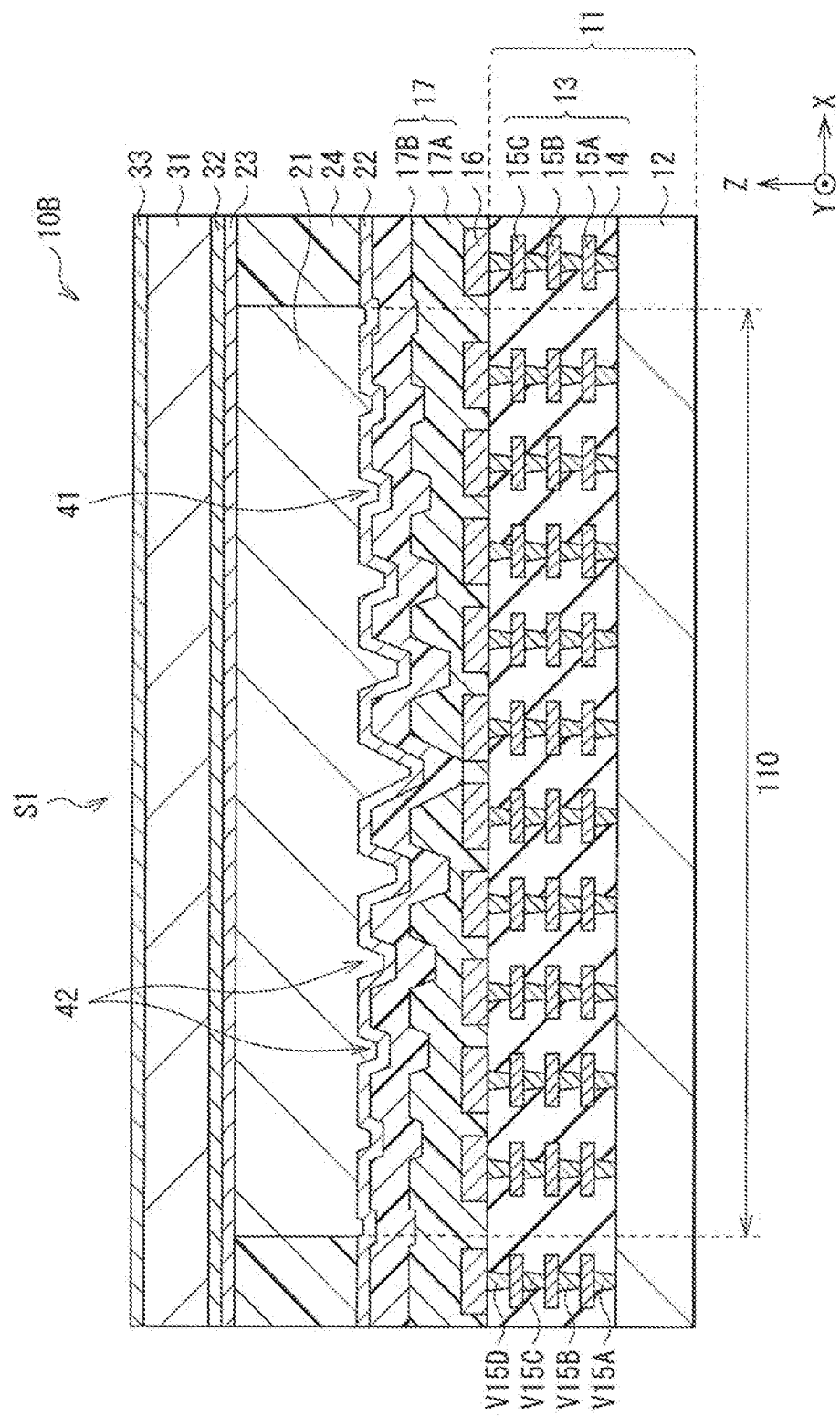
[FIG. 2]

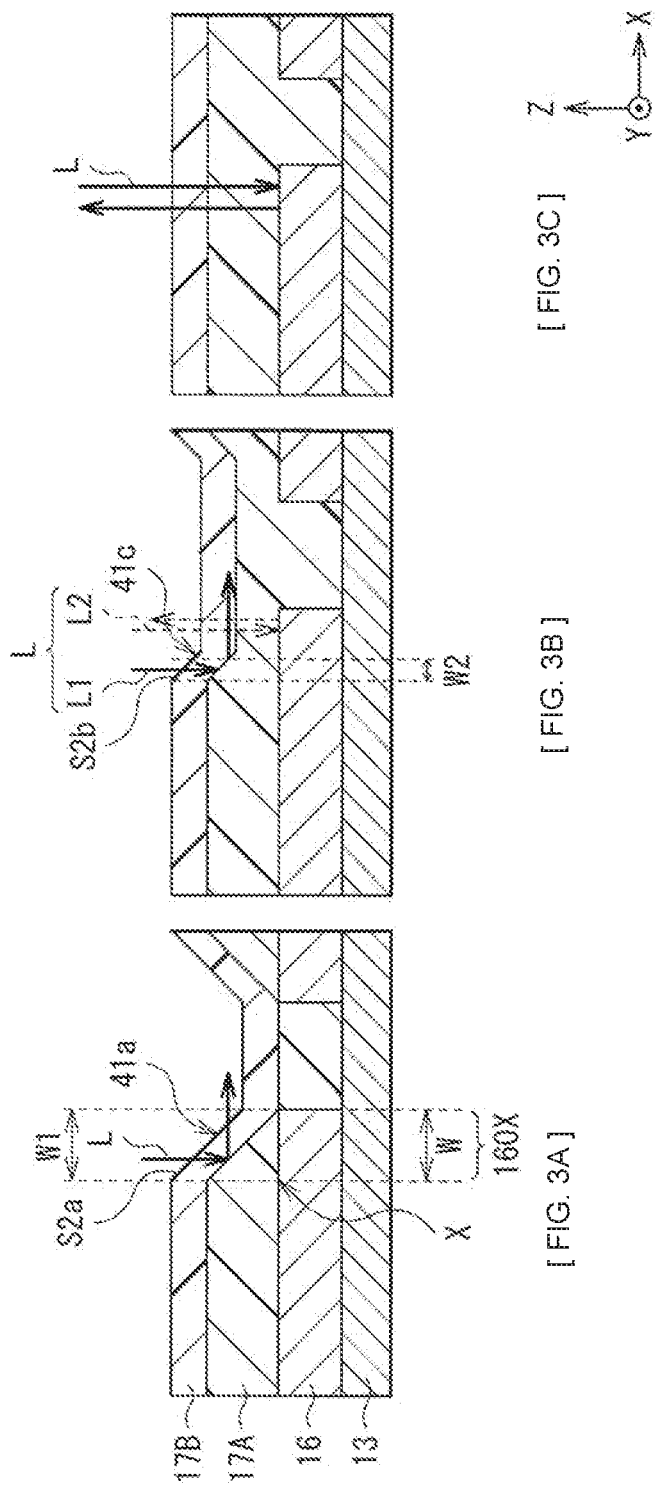

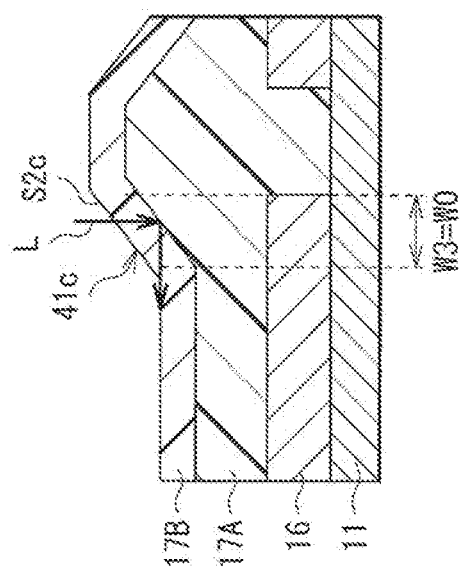
[FIG. 4A]
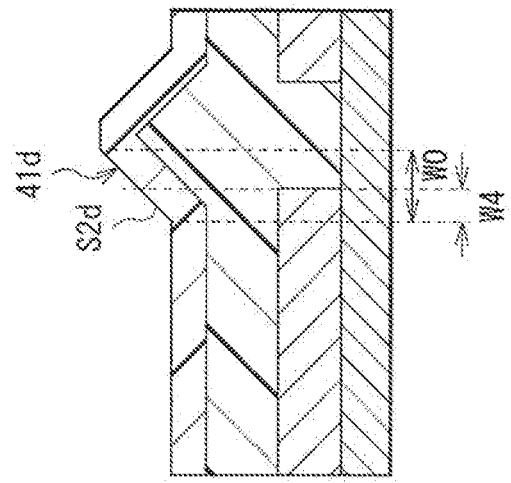
[FIG. 4B]
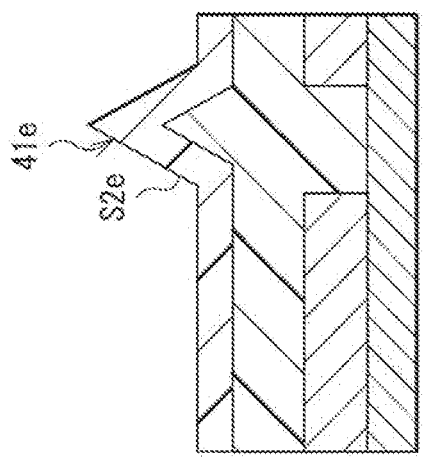
[FIG. 4C]

[FIG. 5A]
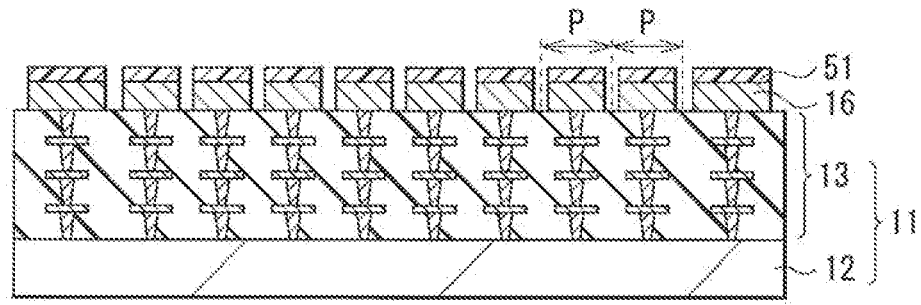
[FIG. 5B]
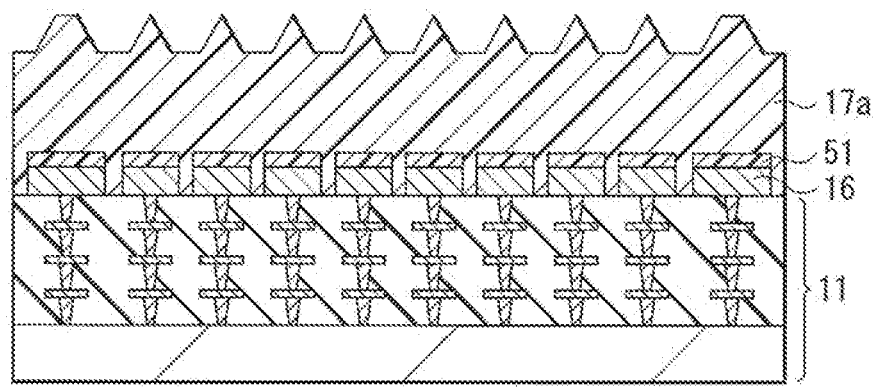
[FIG. 5C]
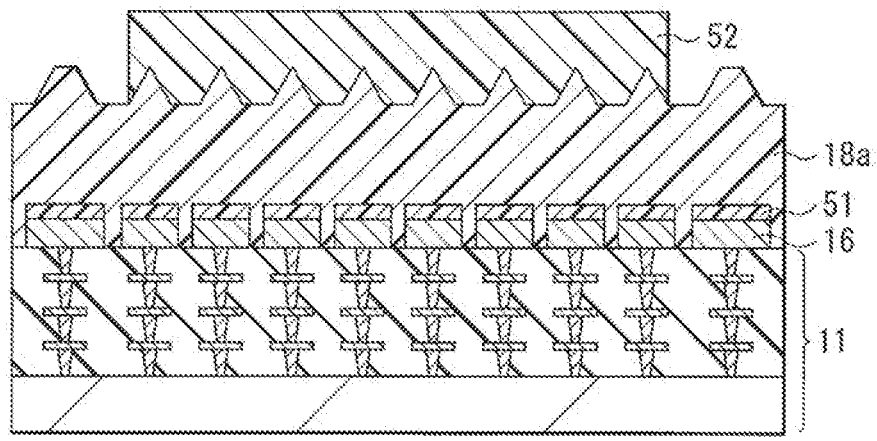

[FIG. 6A]
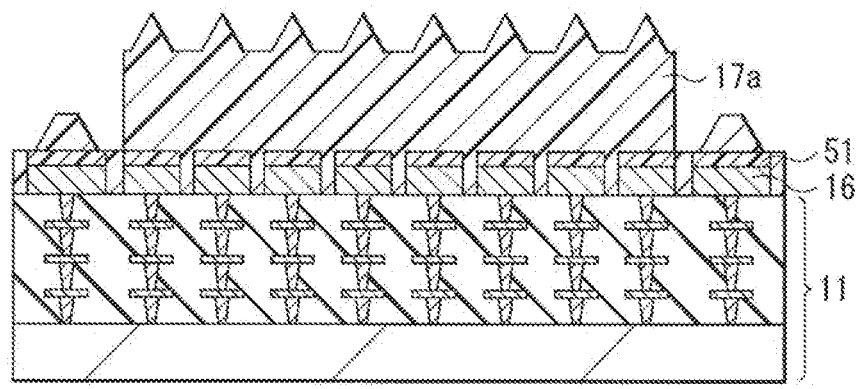
[FIG. 6B]
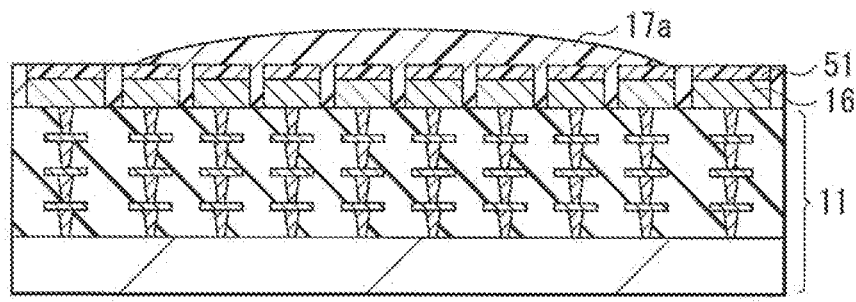
[FIG. 6C]
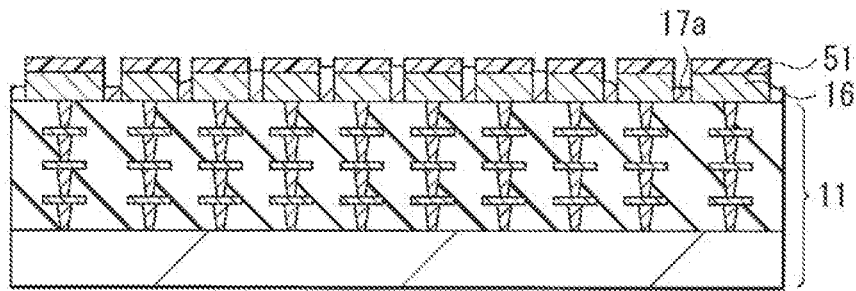

[ FIG. 7A ]
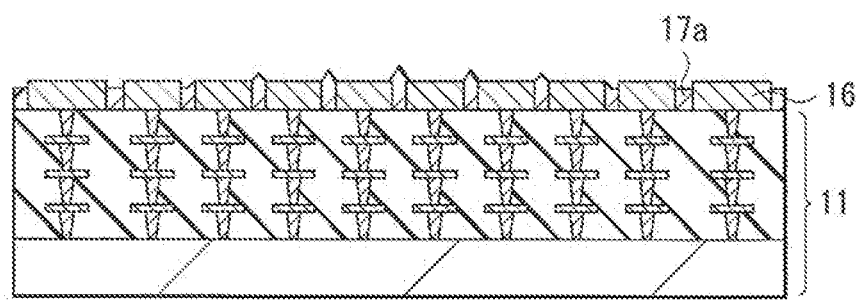
[ FIG. 7B ]
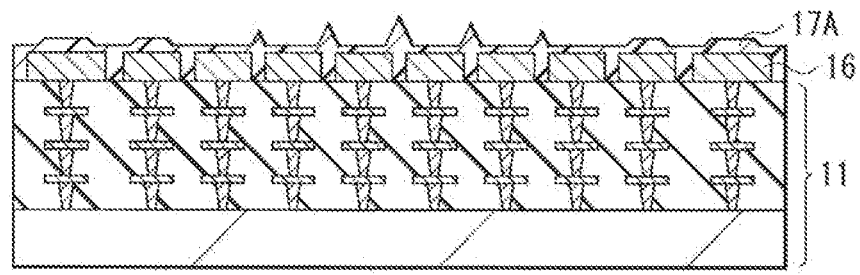
[ FIG. 7C ]
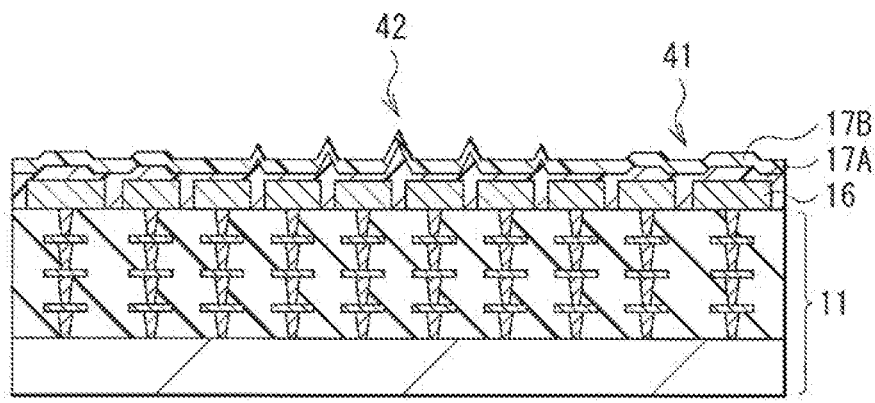

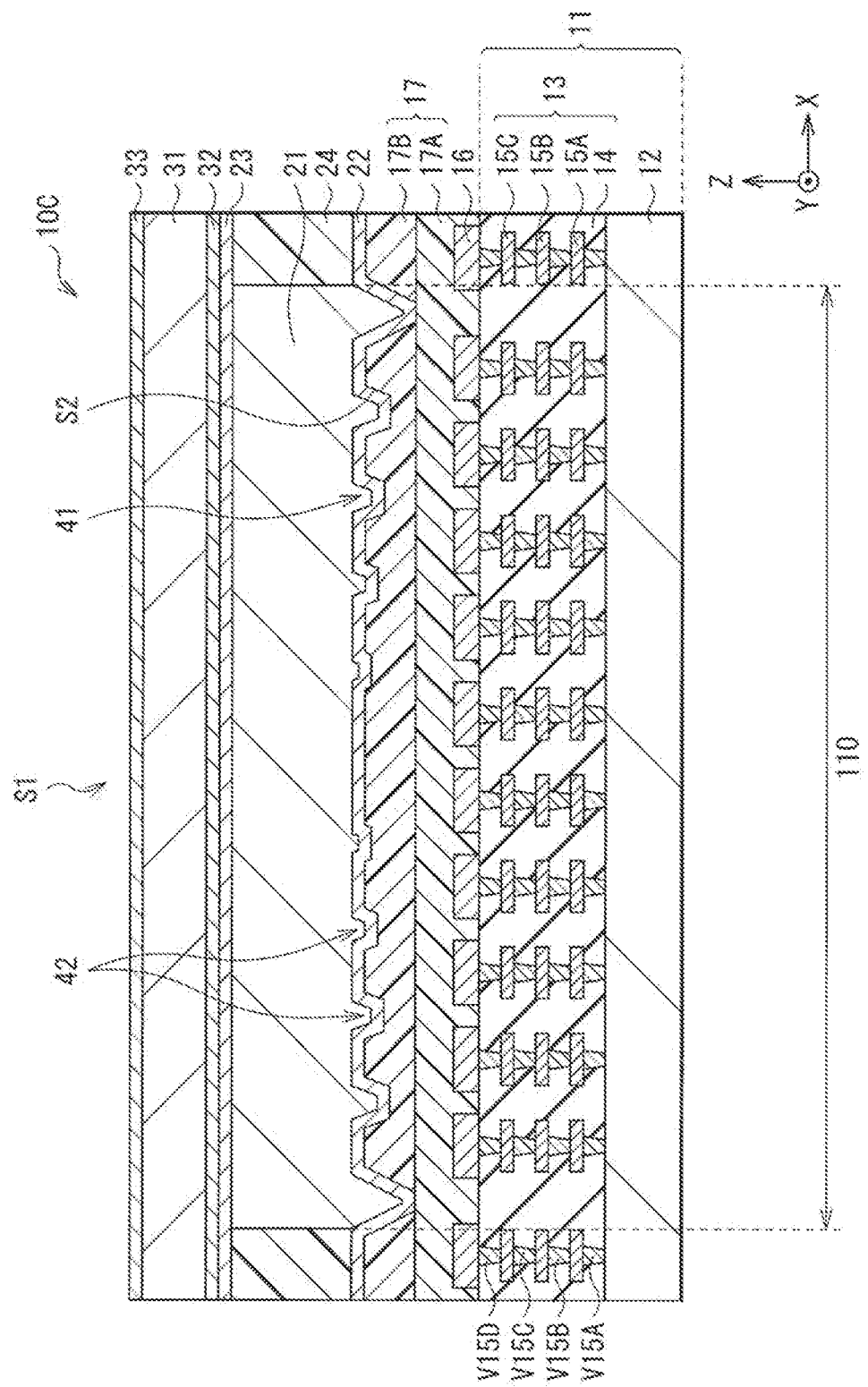
[FIG. 8]

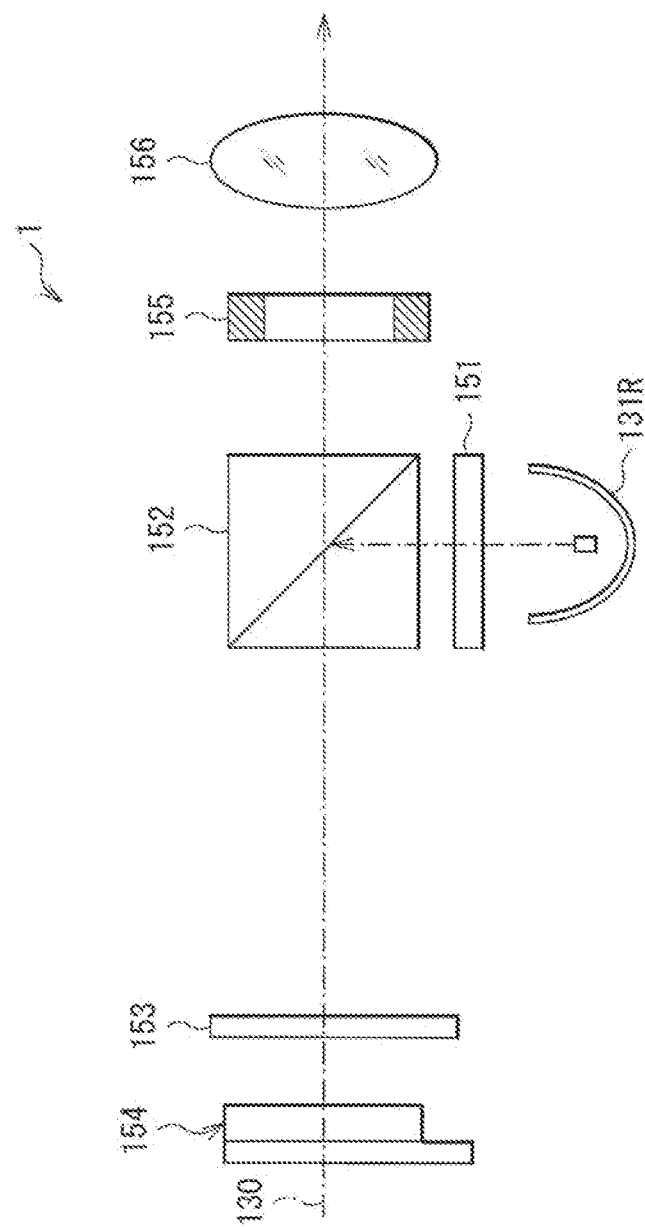
[FIG. 9]

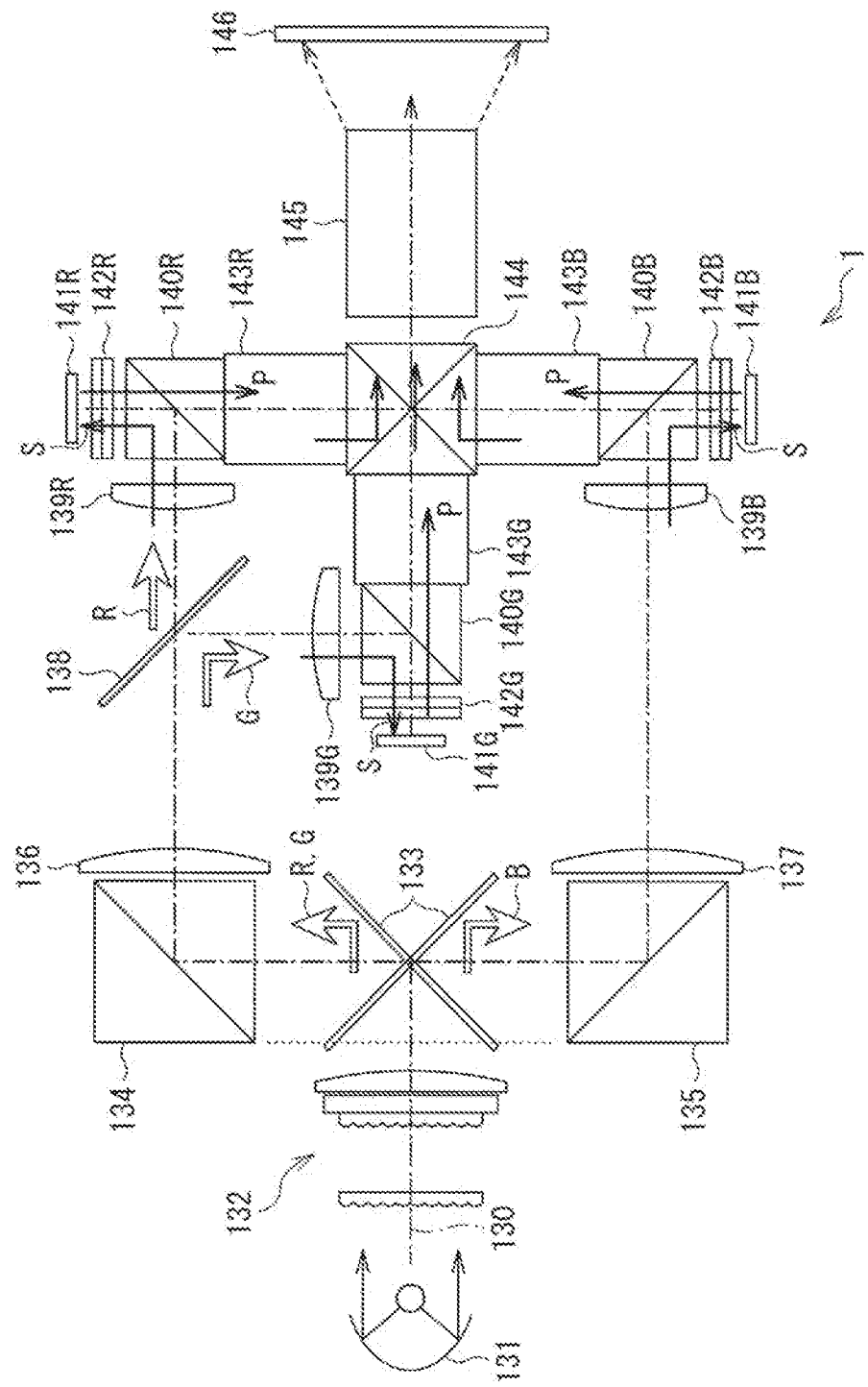
[FIG. 10]

[ FIG. 11 ]
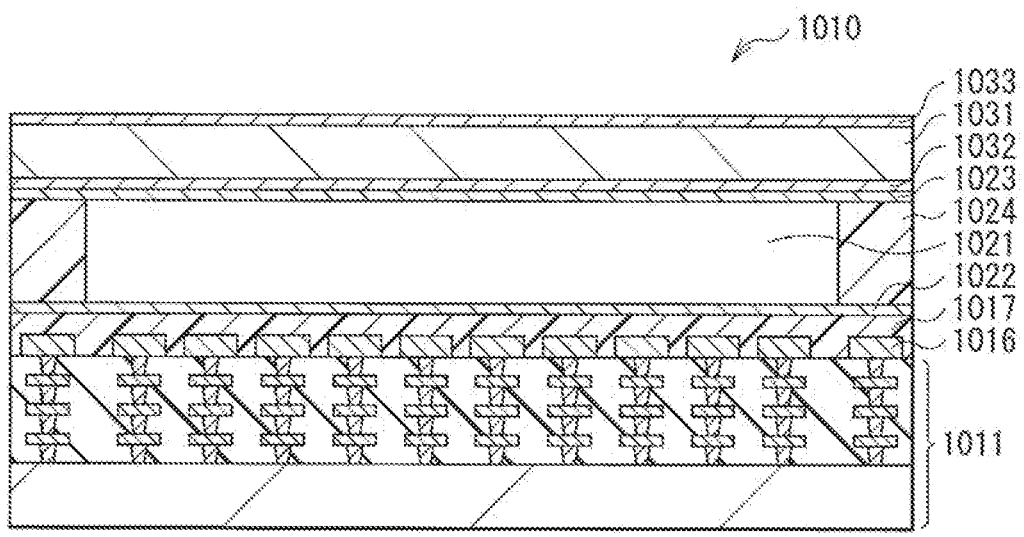
[ FIG. 12 ]
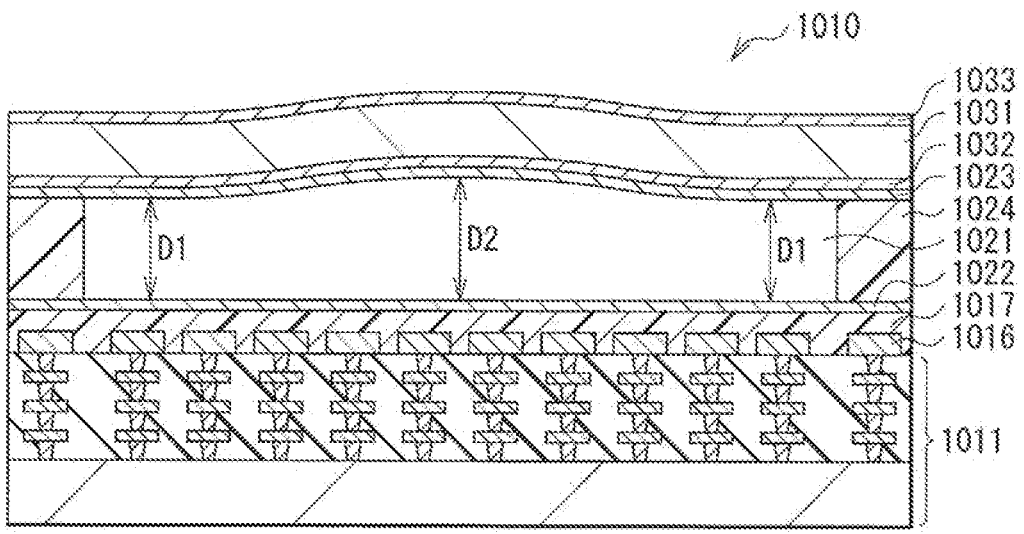

[ FIG. 13A ]
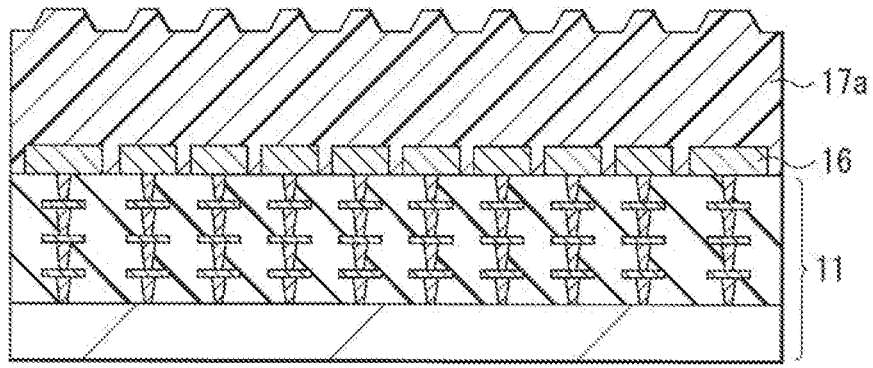
[ FIG. 13B ]
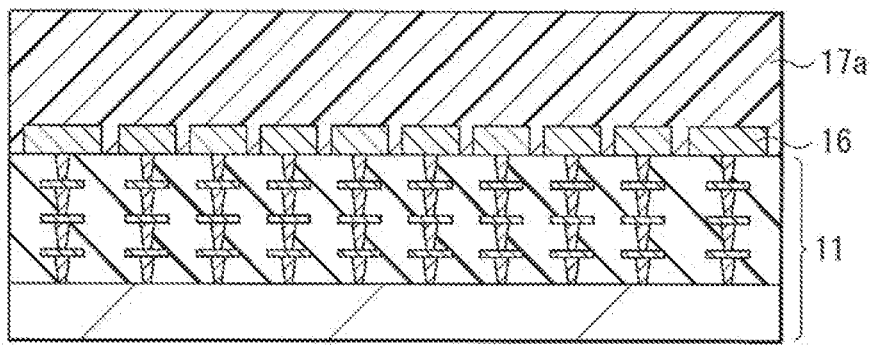
[ FIG. 13C ]
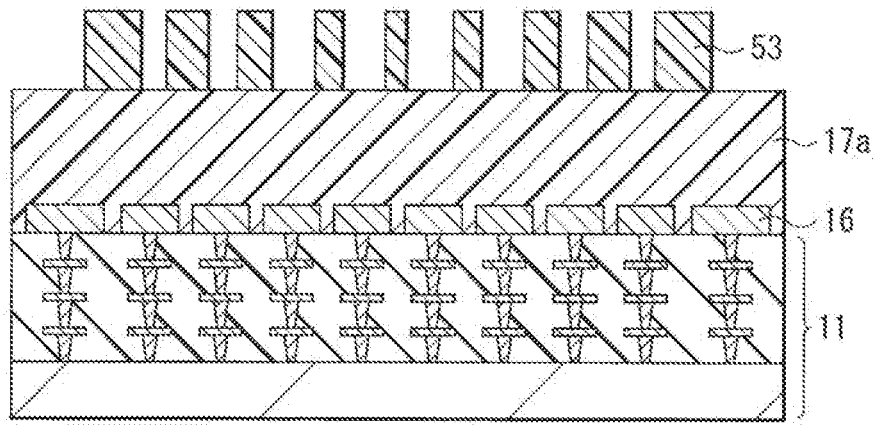

[ FIG. 14A ]
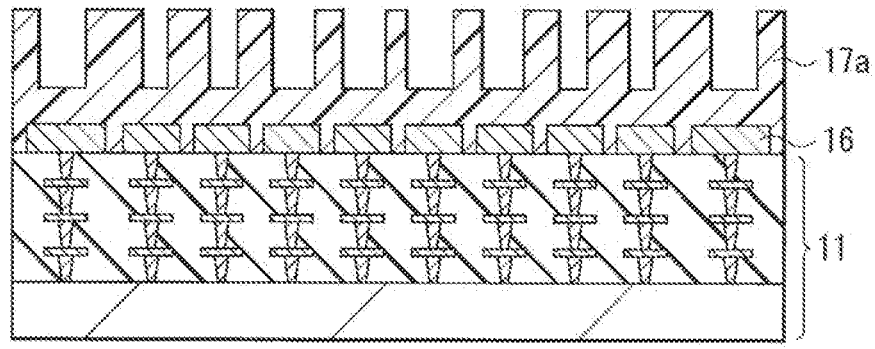
[ FIG. 14B ]
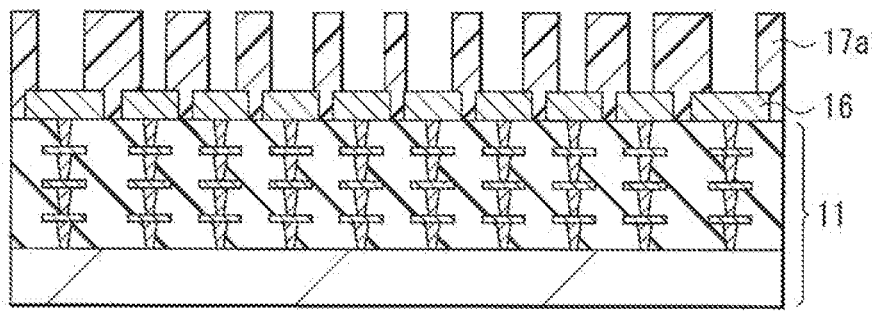
[ FIG. 14C ]
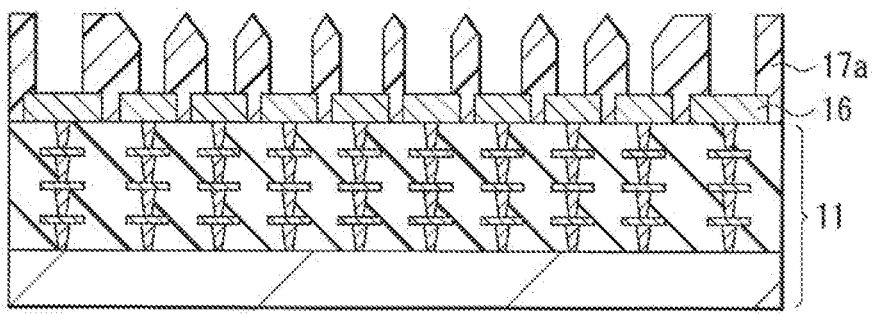

[ FIG. 15A ]
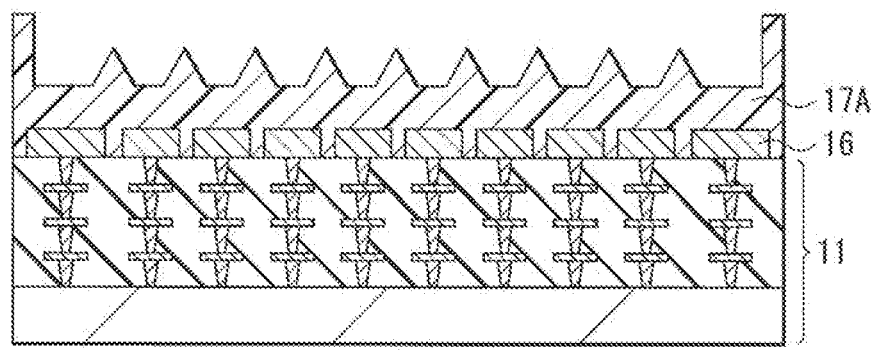
[ FIG. 15B ]
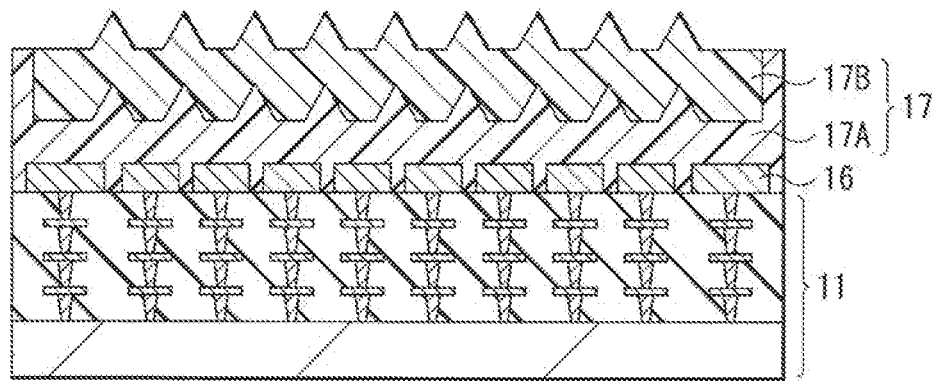

[ FIG. 16A ]
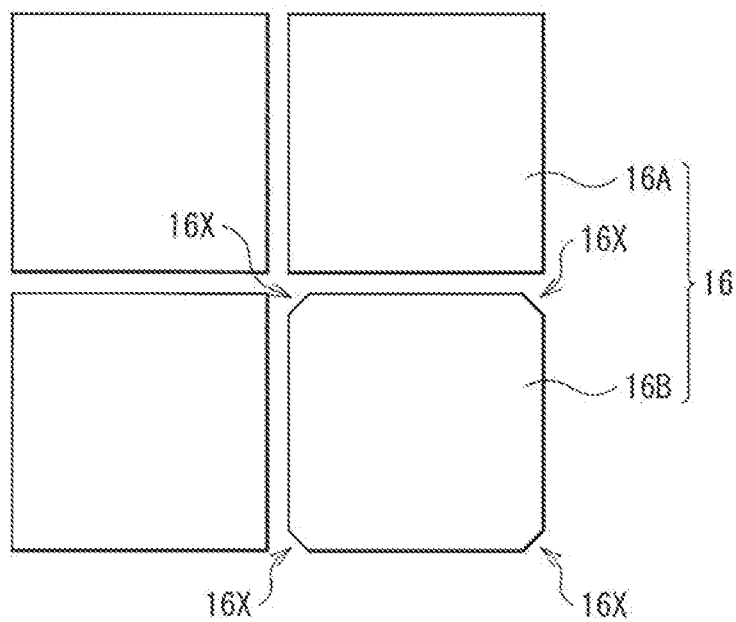
[ FIG. 16B ]
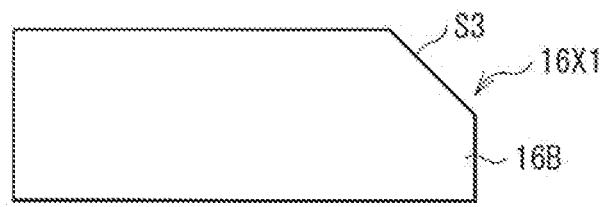
[ FIG. 16C ]
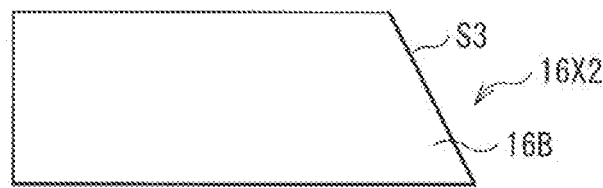

[ FIG. 17A ]
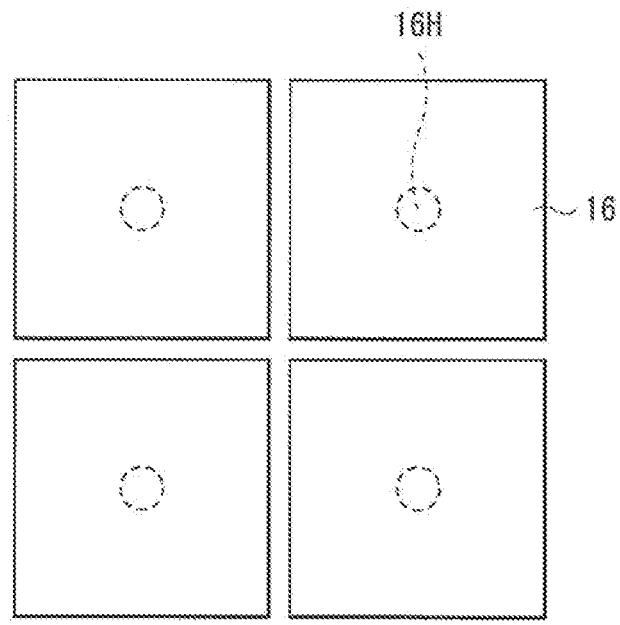
[ FIG. 17B ]
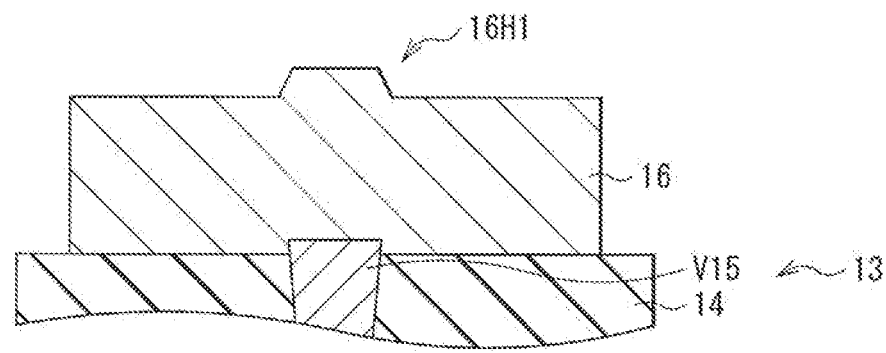
[ FIG. 17C ]
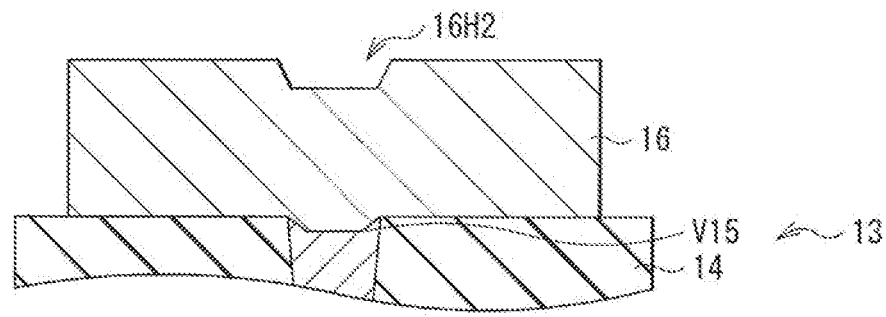

[ FIG. 18 ]
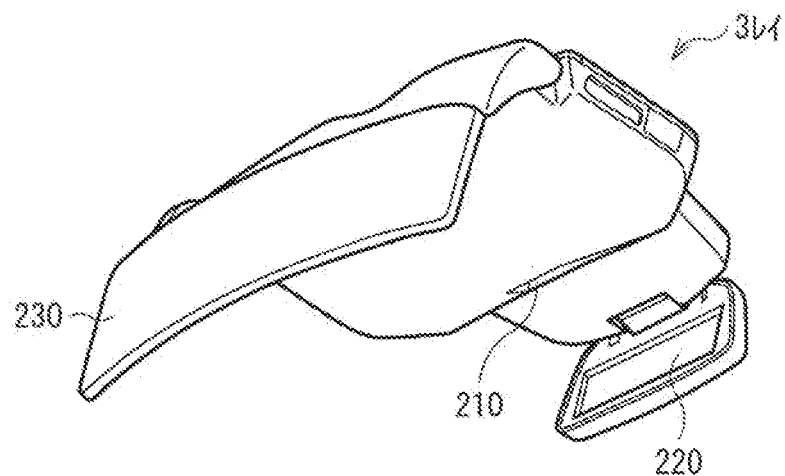
[ FIG. 19 ]
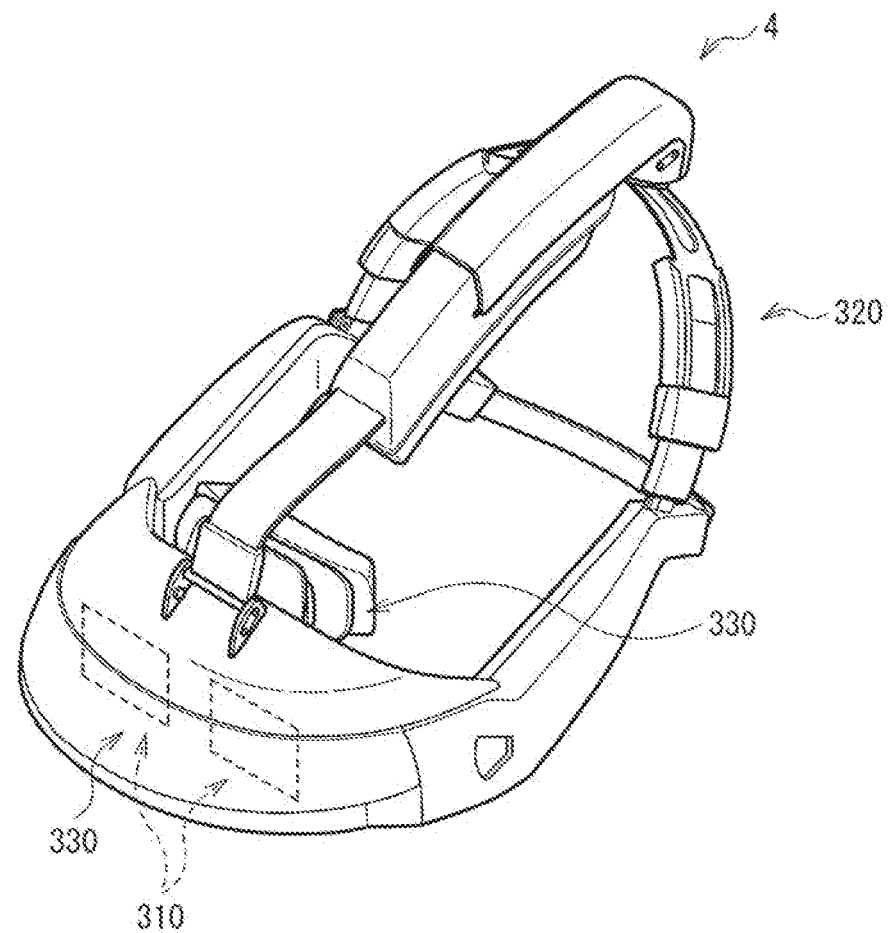

LIQUID CRYSTAL DISPLAY UNIT AND PROJECTION DISPLAY UNIT

CROSS REFERENCE TO RELATED APPLICATIONS

This application is a U.S. National Phase of International Patent Application No. PCT/JP2017/035946 filed on Oct. 3, 2017, which claims priority benefit of Japanese Patent Application No. JP 2016-205218 filed in the Japan Patent Office on Oct. 19, 2016. Each of the above-referenced applications is hereby incorporated herein by reference in its entirety.

TECHNICAL FIELD

The present disclosure relates to a liquid crystal display unit and a projection display unit that are used in a projection liquid crystal projector.

BACKGROUND ART

As a liquid crystal display to be used in a projection liquid crystal projector, a so-called reflective liquid crystal display is available that is provided with pixel electrodes performing both light reflection and liquid crystal control. Among such types of reflective liquid crystal displays, a display that provides drive transistors, wiring lines, etc. on a silicon substrate is called LCOS (Liquid Crystal On Silicon). The reflective liquid crystal display utilizes polarized light of the liquid crystal to perform on-off control of reflection of light emitted from the front onto the pixel electrodes.

In the projection liquid crystal projector using the reflective liquid crystal display such as the LCOS, light to be projected passes through a glass substrate with a transparent electrode, a liquid crystal layer, an alignment film, and a dielectric layer that are provided on a silicon substrate in this order, and is reflected by a pixel electrode. Therefore, the intensity of light of an image to be projected tends to depend on the above-described structures, and in particular, it is necessary to keep constant a distance (a gap length) between the transparent electrode and the pixel electrode on the glass substrate.

The gap length varies due to variation in length of liquid crystal molecules configuring the liquid crystal layer. For example, the liquid crystal molecules expand due to rise in temperature, etc., and thus the liquid crystal layer increases in thickness due to heating at the time of driving, leading to the variation in the gap length. Therefore, a direct-view liquid crystal display generally keeps the gap length constant by providing a spacer inside a display region. In contrast, in the projection liquid crystal display, a size of the pixel electrode is as small as, for example, 10 μm per side, and therefore provision of the spacer has more influence on light to be projected. Accordingly, a method is devised to keep the gap length constant without using the spacer. For example, PTL 1 discloses a liquid crystal display unit that adjusts the gap length by forming a recessed section configured with use of the periphery of a pixel region as an edge thereof on a silicon substrate side.

CITATION LIST

Patent Literature

PTL 1: Japanese Unexamined Patent Application Publication No. 2003-161936

SUMMARY OF THE INVENTION

Incidentally, a smaller-sized LCOS has a gap length that tends to vary as compared with a typical projection liquid crystal display. Therefore, a configuration is demanded that makes it possible to make the amount of light in a pixel region uniform.

It is desirable to provide a liquid crystal display unit and a projection display unit that make it possible to make the amount of light in the pixel region uniform.

A liquid crystal display unit according to an embodiment of the present disclosure has a liquid crystal panel having a pixel region including a plurality of pixels, and the liquid crystal panel includes: a first substrate on which a plurality of pixel electrodes having light reflectivity are provided for each of the pixels; a second substrate disposed in opposition to the first substrate; a liquid crystal layer disposed between the first substrate and the second substrate; and an interlayer film provided between the first substrate and the liquid crystal layer, and the interlayer film has a plurality of sloped sections each including at least a portion facing a corresponding one of the plurality of pixel electrodes, and the plurality of sloped sections each have a slope width that faces the corresponding one of the plurality of pixel electrodes and that differs from one another.

A projection display unit according to an embodiment of the present disclosure has: a light source; a liquid crystal panel according to the above-described embodiment that includes a pixel region that allows light from the light source to be modulated and light corresponding to an image to be outputted; and a projection lens that projects the image on the basis of output light of the liquid crystal panel.

In the liquid crystal display unit according to the embodiment of the present disclosure and the projection display unit according to the embodiment, on the interlayer film between the first substrate and the liquid crystal layer, the plurality of sloped sections are provided that each include at least a portion facing a corresponding one of the plurality of pixel electrodes, and the plurality of sloped sections each have a slope width that faces the corresponding one of the plurality of pixel electrodes and that differs from one another. This makes it possible to change the optical reflectance in the pixel region.

According to the liquid crystal display unit of the embodiment of the present disclosure and the projection display unit of the embodiment, on the interlayer film, the plurality of sloped sections are provided that each have the slope width that faces the corresponding one of the plurality of pixel electrodes and that differs from one another, which makes it possible to change the optical reflectance in a predetermined region inside the pixel region. This makes it possible to make the amount of light in the pixel region uniform.

It is to be noted that the effects described here are not necessarily limitative, and any of effects described in the present disclosure may be provided.

BRIEF DESCRIPTION OF DRAWINGS

FIG. 1 is a cross-sectional view of an example of a configuration of a liquid crystal panel according to an embodiment of the present disclosure.

FIG. 2 is a cross-sectional view of another example of a configuration of the liquid crystal panel according to the embodiment of the present disclosure.

FIGS. 3A, 3B, and 3C are schematic views for illustrating reflection of light using sloped sections provided on a pixel electrode.

FIGS. 4A, 4B, and 43C are schematic views for illustrating reflection of light using the sloped sections provided on the pixel electrode.

FIG. 5A is a schematic view for illustrating a method of manufacturing the liquid crystal panel of the present disclosure.

FIG. 5B is a cross-sectional view of a process following a process illustrated in FIG. 5A.

FIG. 5C is a cross-sectional view of a process following the process illustrated in FIG. 5B.

FIG. 6A is a cross-sectional view of a process following the process illustrated in FIG. 5C.

FIG. 6B is a cross-sectional view of a process following the process illustrated in FIG. 6A.

FIG. 6C is a cross-sectional view of a process following the process illustrated in FIG. 6B.

FIG. 7A is a cross-sectional view of a process following the process illustrated in FIG. 6C.

FIG. 7B is a cross-sectional view of a process following the process illustrated in FIG. 7A.

FIG. 7C is a cross-sectional view of a process following the process illustrated in FIG. 7B.

FIG. 8 is a cross-sectional view of another example of a configuration of the liquid crystal panel according to the embodiment of the present disclosure.

FIG. 9 illustrates an example of an overall configuration of a projection display unit including the liquid crystal panel of the present disclosure.

FIG. 10 illustrates another example of an overall configuration of the projection display unit including the liquid crystal panel of the present disclosure.

FIG. 11 is a cross-sectional view of a configuration of a liquid crystal panel as a comparative example.

FIG. 12 is a cross-sectional view showing a shape variation at the time of using the liquid crystal panel illustrated in FIG. 11.

FIG. 13A is a cross-sectional view for describing a method of manufacturing a liquid crystal panel in a modification example 1 of the present disclosure.

FIG. 13B is a cross-sectional view of a process following a process illustrated in FIG. 13A.

FIG. 13C is a cross-sectional view of a process following the process illustrated in FIG. 13B.

FIG. 14A is a cross-sectional view of a process following the process illustrated in FIG. 13C.

FIG. 14B is a cross-sectional view of a process following the process illustrated in FIG. 14A.

FIG. 14C is a cross-sectional view of a process following the process illustrated in FIG. 14B.

FIG. 15A is a cross-sectional view of a process following the process illustrated in FIG. 14C.

FIG. 15B is a cross-sectional view of a process following the process illustrated in FIG. 15A.

FIG. 16A is a plan view of shapes of pixel electrodes in a modification example 2 of the present disclosure.

FIG. 16B is a schematic view of an example of a cross-sectional shape of the pixel electrode illustrated in FIG. 16A.

FIG. 16C is a schematic view of another example of a cross-sectional shape of the pixel electrode illustrated in FIG. 16A.

FIG. 17A is a plan view of shapes of pixel electrodes in a modification example 3 of the present disclosure.

FIG. 17B is a schematic view of an example of a cross-sectional shape of the pixel electrode illustrated in FIG. 17A.

FIG. 17C is a schematic view of another example of a cross-sectional shape of the pixel electrode illustrated in FIG. 17A.

FIG. 18 illustrates an external appearance of an electronic apparatus (a head-up display) using the projection display unit illustrated in FIG. 10.

FIG. 19 illustrates an external appearance of an electronic apparatus (a head-mounted display) using the projection display unit illustrated in FIG. 10.

MODES FOR CARRYING OUT THE INVENTION

Hereinafter, some embodiments of the present disclosure will be described in detail with reference to the drawings. The following descriptions deal with a specific example of the present disclosure, and the present disclosure is not limited to the following aspects. Further, a placement layout, dimensions, a dimension ratio, etc. of each of component parts in the present disclosure are not also limited to those illustrated in each of the drawings. It is to be noted that descriptions are given in the following order.

1. Embodiment (an Example where a Plurality of Irregular Structures Having a Difference in Level are formed in a pixel region of a dielectric layer)
   1-1. Configuration of Liquid Crystal Panel
   1-2. Manufacturing Method of Liquid Crystal Panel
   1-3. Configuration of Projection Display Unit
   1-4. Workings and Effects
2. Modification Examples
   2-1. Modification Example 1 (an example of another manufacturing method of the irregular structures on the dielectric layer)
   2-2. Modification Example 2 (an example where a notch is formed at a portion on an end face of a pixel electrode)
   2-3. Modification Example 3 (an example where a recessed section or a protruding section is formed in a plane of a pixel electrode)

1. Embodiment

1-1. Configuration of Liquid Crystal Panel

FIG. 1 illustrates an example of a cross-sectional configuration of a liquid crystal display unit (a liquid crystal panel 10A) according to an embodiment of the present disclosure. FIG. 2 illustrates another example of a cross-sectional configuration of a liquid crystal display unit (a liquid crystal panel 10B) according to the embodiment of the present disclosure. Each of the liquid crystal panel 10A and the liquid crystal panel 10B has, for example, a structure in which pixel electrodes 16, a dielectric layer 17 (an interlayer film), and a liquid crystal layer 21 are stacked in order from a pixel circuit substrate 11 side between the pixel circuit substrate 11 (a first substrate) and a counter substrate 31 (a second substrate) that are disposed in opposition to each other. On the liquid crystal layer 21, alignment films 22 and 23 are provided on each side of the pixel circuit substrate 11 and the counter substrate 31, and a peripheral edge of the liquid crystal layer 21 is sealed with a sealing material 24. On the counter substrate 31, a counter electrode 32 is provided on the side of the pixel circuit substrate 11, and a polarization plate 33 is attached to a surface S1 on a side opposite to the pixel electrodes 16.

The liquid crystal panel 10A and the liquid crystal panel 10B of the present embodiment each have, in a plane, a pixel region 110 including a plurality of pixels P, and a plurality of sloped sections 41 are provided on the dielectric layer 17 in the pixel region 110. Such a plurality of sloped sections 41 are provided such that at least a portion of a sloped surface S2 of the sloped section 41 faces a corresponding one of the plurality of pixel electrodes 16, and have a configuration in which slope widths W (widths in an X-axis direction in FIG. 1) of the sloped surfaces S2 facing the pixel electrodes 16 are different in the pixel region 110. The slope widths W vary, for example, in a step-by-step manner from a central part toward a peripheral edge of the pixel region 110, for example.

The pixel circuit substrate 11 includes a substrate 12 and a pixel circuit 13 provided on the substrate 12. The pixel circuit 13 includes an insulating layer 14 provided on the substrate 12, and a plurality of wiring lines 15A, 15B, and 15C that are provided in the insulating layer 14 and electrically coupled to one another through vias V15A, V15B, V15C, and V15D, for example. The pixel circuit 13 is formed for each of the pixels P. On the pixel circuit substrate 11, the plurality of pixel electrodes 16 having the light reflectivity are provided, and the pixel electrodes 16 are each electrically coupled to the wiring line 15C configuring the pixel circuit 13 through the via V15D, for example. The dielectric layer 17 is provided on the pixel electrodes 16, and the plurality of sloped sections 41 as described above are provided on a surface (on the side of the liquid crystal layer 21) of the dielectric layer 17. The dielectric layer 17 has a two-layered structure in which a dielectric layer 17B is stacked on a dielectric layer 17A, for example. For the plurality of sloped sections 41, FIG. 1 and FIG. 2 each illustrate an example in which irregular structures configuring the sloped sections 41 are formed only on the dielectric layer 17B serving as an upper layer. However, for example, as illustrated in FIGS. 3A, 3B, and 3C, FIGS. 4A, 4B, and 4C, FIG. 7C, etc., the irregular structures may be formed on the dielectric layer 17A serving as a lower layer, and the sloped sections 41 may be formed on a surface of the dielectric layer 17B on the basis of such irregular structures. On the dielectric layer 17, the alignment film 22 is provided along the irregularities on the surface of the dielectric layer 17 formed by the sloped sections 41.

The counter substrate 31 is provided with the common counter electrode 32 across all of the pixels P on a surface facing the liquid crystal layer 21, and the alignment film 23 that seals, together with the alignment film 22, the liquid crystal layer 21 in a planar direction is attached to the counter electrode 32. The polarization plate 33 is attached to the surface S1 side serving as a light incoming surface and a light outgoing surface of the counter substrate 31.

The liquid crystal layer 21 is provided between the alignment film 22 and the alignment film 23. The liquid crystal layer 21 is sealed by the alignment film 22 and the alignment film 23 in the planar direction thereof, and a peripheral edge of the liquid crystal layer 21 is sealed with the sealing material 24 at an end of each of the liquid crystal panel 10A and the liquid crystal panel 10B.

It is to be noted that a peripheral circuit to drive each of the pixels P is formed at the periphery (a peripheral region (unillustrated)) of the pixel region 110 of the pixel circuit substrate 11.

The substrate 12 includes, for example, a silicon substrate. The insulating layer 14 includes a silicon oxide film, etc. using a plasma CVD method, for example. For the wiring lines 15A, 15B, and 15C, as well as the vias V15A, V15B, V15C, and V15D electrically coupling those wiring lines to one another, for example, in a case where the wiring lines 15A, 15B, and 15C are formed using Al, the vias V15A, V15B, V15C, and V15D are formed using a CVD-W, etc., for example. In a case where the wiring lines 15A, 15B, and 15C are formed as Cu wiring lines, the vias V15A, V15B, V15C, and V15D are formed using a dual damascene method, for example. It is to be noted that, in a case where the wiring lines 15A, 15B, and 15C are formed as the Cu wiring lines, a main material containing Al as a main component is preferably used for the pixel electrode 16. In such a case, the via V15D that couples the pixel electrode 16 and the wiring line 15C to each other is preferably formed using the CVD-W. As described above, a main material containing Al as a main component is preferably used for the pixel electrode 16, and the pixel electrode 16 includes a conductive film having light reflectivity that is formed using, for example, aluminum (Al), AlCu, AlSi, etc. The dielectric layers 17 (the dielectric layer 17A and the dielectric layer 17B) each include a dielectric material. For example, the dielectric layer 17A includes a silicon oxide ($SiO_x$), and the dielectric layer 17B includes a silicon nitride ($SiN_x$).

The counter substrate 31 includes a transparent substrate having light transmissive property that is formed using, for example, quartz, glass, silicon materials, etc. The counter substrate 32 includes a transparent conductive film that is formed using, for example, ITO (indium tin oxide), etc. The polarization plate 33 includes polyvinyl alcohol (PVA) in which iodine (I) compound molecules are subjected to absorption orientation, for example.

The liquid crystal layer 21 includes a variety of liquid crystals including, for example, a VA (Vertical Alignment) type, a TN (Twisted Nematic) type, an IPS (In-Place-Switching) type, etc., and display is performed in a normally black mode or a normally white (NW) mode, for example. The alignment films 22 and 23 each include an insulating film that is formed using, for example, polyimide, etc.

In the present embodiment, the liquid crystal panel 10 (the liquid crystal panels 10A and 10B) is provided with the plurality of sloped sections 41 on a surface (on the surface S1 side) of the dielectric layer 17 in the pixel region 110, as described above. For example, each of such a plurality of sloped sections 41 is provided at a position facing the pixel electrode 16, in particular, at a position shifted from a center to a peripheral part of the pixel electrode 16, and at least a portion of the sloped surface S2 configuring the sloped section 41 is formed on the pixel electrode 16.

For example, the sloped surface S2 of the sloped section 41 may be sloped toward a direction in which the dielectric layer 17 becomes smaller in thickness relative to a surface of the dielectric layer 17, that is, toward the pixel circuit substrate 11 side. Alternatively, the sloped surface S2 may be sloped toward a direction in which the dielectric layer 17 becomes greater in thickness relative to the surface of the dielectric layer 17, that is, toward the counter substrate 31 side. Each of the sloped sections 41 is provided at a portion or all of the peripheral part of the pixel electrode 16 having, for example, a rectangular shape. In a case where the sloped section 41 is provided continuously at all of the peripheral part of each of the pixel electrodes 16, the sloped surfaces S2 formed on the respective pixel electrodes 16 face each other between the adjoining pixel electrodes 16. In other words, a recessed section 42 or a protruding section 43 having the sloped surface S2 of the sloped section 41 as a side surface thereof (for example, see FIG. 7C) is formed between the adjoining pixel electrodes 16.

In the present embodiment, each of widths of the sloped surfaces S2 (the slope widths W) facing the pixel electrodes 16 is formed to differ from each other in the pixel region 110. FIGS. 3A, 3B, 3C, 4A, 4B, and 4C are each a schematic view for illustrating positions of the pixel electrode 16 and the sloped surface S2 facing the pixel electrode 16, the shape of the sloped surface S2, and the reflective direction of light (L) based on such an arrangement.

FIG. 3C illustrates a reflective direction of the light (L) in a case where the sloped section 41 is not provided on the dielectric layer 17, the surface of the dielectric layer 17 is flat. In a case where the dielectric layer 17 on the pixel electrode 16 is flat as illustrated in FIG. 3, for example, the light (L) that is outputted from a light source 131 of a projection display unit 1 to be described later and emitted from a front direction (Z-axis direction) of the liquid crystal panel 10A is reflected by the pixel electrode 16, and thereby the whole light (L) is reflected in the Z-axis direction.

In contrast, as illustrated in FIGS. 3A and 3B, in a case where the sloped section 41 (41a and 41b) having the sloped surface S2 (S2a and S2b) in which the thickness of the dielectric layer 17 gradually decreases as it goes toward an area between the pixels P is provided on the pixel electrode 16, the light (L) emitted on the sloped sections 41 is reflected by the sloped surface S2 in any direction other than the Z-axis direction, for example, in the X-axis direction. This results in a decrease in the optical reflectance on the pixel electrode 16. Such a decrease in the optical reflectance is proportional to a ratio of the light (L) reflected in any direction other than the Z-axis direction. In other words, if the slope width W of the sloped section 41 facing the pixel electrode 16 is greater, the optical reflectance on the pixel electrode 16 is reduced further.

For example, as illustrated in FIG. 3A, in a case where a sloped section 41a having a slope width W1 that is the same width as a width (Wx) of the region 160X is provided for a region 160X extending from a certain position of the pixel electrode 16 to an end thereof, the light (L) emitted on the region 160X is wholly reflected by a sloped surface S2a of the sloped section 41a in the X-axis direction, for example. In contrast, as illustrated in FIG. 3B, in a case where a sloped section 41b having a slope width W2 that is smaller than the width (Wx) of the region 160X (Wx>W2) is provided, the light (L) emitted on the region 160X, the light (L1) emitted on the sloped section 41b is reflected by a sloped surface S2b of the sloped section 41b in the X-axis direction, for example, and light (L2) emitted on a region other than the sloped section 41b is reflected by the pixel electrode 16 in the Z-axis direction. As a result, the optical reflectance on the pixel electrode 16 in FIG. 3A becomes lower than the optical reflectance on the pixel electrode 16 in FIG. 3B.

It is to be noted that the reduction in the optical reflectance by the sloped section 41 does not attribute limitatively to a shape of the sloped surface S2 of the sloped section 41. In other words, as illustrated in FIGS. 4A, 4B, and 4C, also in a case where the sloped section 41 (41c, 41d, and 41e) having the sloped surface S2 (S2c, S2d, and S2e) in which the thickness of the dielectric layer 17 gradually increases as it goes toward the area between the pixels P is provided, similarly to the above-described case, if the slope width W of the sloped section 41 provided on the pixel electrode 16 is greater, the optical reflectance on the pixel electrode 16 is reduced further.

FIGS. 4A, 4B, and 4C, illustrate examples in which the entire lengths of the sloped surfaces S2 configuring the sloped sections 41, i.e., the total widths (slope widths W0) of the sloped sections 41 are the same; however, the sloped sections 41 are provided at different positions relative to the pixel electrode 16. In FIG. 4A, a whole sloped surface S2c configuring a sloped section 41c faces the pixel electrode 16. In other words, a slope width W3 of the sloped section 41c facing the pixel electrode 16 is equal to the total slope width W0 of the sloped section 41c (W3=W0). In contrast, in FIG. 4B, a sloped surface S2d configuring a sloped section 41d is partially provided on the pixel electrode 16, and a slope width W4 facing the pixel electrode 16 is smaller than the total slope width W0 of the sloped section 41d (W4<W0). Further, in FIG. 4C, a sloped section 41e is only formed between the adjoining pixel electrodes 16, and a sloped surface S2e of the sloped section 41e does not face the pixel electrode 16. In other words, the slope width W facing the pixel electrode 16 in each of FIGS. 4A, 4B, 4C, and 4D becomes greater in the order of FIG. 4C, FIG. 4B, and FIG 4A. As a result, the optical reflectance of FIG. 4A is the lowest, and the optical reflectance of FIG. 4B is the second-lowest. In FIG. 4C, the optical reflectance is not reduced, as with FIG. 3C in which none of the sloped sections 41 is provided.

In this way, the optical reflectance on the pixel electrode 16 varies depending on a size of a non-light-reflecting region to be formed on the pixel electrode 16. Here, the non-light-reflecting region refers to, for example, a region in which light emitted from the front of the liquid crystal panel 10A is reflected in a direction other than the front direction. Therefore, if any one of factors including an angle of the sloped surface S configuring the sloped section 41 that forms the non-light-reflecting region, a distance (I) between the adjoining sloped sections 41, and an entire length of the sloped surface S2 configuring each of the sloped sections 41, i.e., the total slope width (W0) of the sloped section 41 differs, the optical reflectance of each of the plurality of pixel electrodes 16 on which the sloped section 41 is provided is different. It is to be noted that, if any one of the above-described factors is different, any other factors may be the same each other, or may be different from each other. For example, in a case where each of distances between the adjoining sloped sections 41 in the pixel region 110 is different, even though the tilt angles and the slope widths W are the same, the slope width W to be formed on the pixel electrode 16 varies in the pixel region 110.

Specifically, for example, in a case where it is desired to reduce the amount of light at a peripheral part in a plane of the pixel region 110, it is preferable to form the slope width W of the sloped section 41 facing the pixel electrode 16 such that the slope width W becomes gradually greater as it goes from a central part toward the peripheral part of the pixel region 110. At this occasion, in a case where intervals of the adjoining sloped sections 41 in the area between the adjoining pixels P are equal, the total slope widths W0 of the sloped sections 41 are set to become gradually greater as it goes from the central part toward the peripheral part of the pixel region 110, as illustrated in FIG. 1. In other words, differences in levels (D) of the recessed sections 42 formed by the adjoining sloped sections 41 are set to become gradually greater as it goes from the central part toward the peripheral part of the pixel region 110. This allows the slope width W facing the pixel electrode 16 to become gradually greater as it goes toward the peripheral part, resulting in reduction in the amount of light at the peripheral part.

Further, for example, in a case where it is desired to reduce the amount of light at the central part in the plane of the pixel region 110, it is preferable to form the slope width W of the sloped section 41 facing the pixel electrode 16 such that the slope width W becomes gradually greater as it goes from the peripheral part toward the central part of the pixel region 110. At this occasion, in a case where intervals of the adjoining sloped sections 41 in the area between the adjoining pixels P are equal, the total slope widths W0 of the sloped sections 41 are set to become gradually greater as it goes from the peripheral part toward the central part of the pixel region 110, as illustrated in FIG. 2. In other words, the differences in levels (D) of the recessed sections 42 formed by the adjoining sloped sections 41 are set to become gradually greater as it goes from the peripheral part toward the central part of the pixel region 110. This allows the slope width W facing the pixel electrode 16 to become gradually greater as it goes toward the central part, resulting in reduction in the amount of light at the central part.

In this way, increasing the slope width W facing the pixel electrode 16 in a region where the amount of light is desired to be reduced makes it possible to reduce the amount of light in the region.

1-2. Manufacturing Method of Liquid Crystal Panel

It is possible to manufacture the liquid crystal panel 10 of the present embodiment in the following manner, for example.

FIGS. 5A, 5B, 5C, 6A, 6B, 6C, 7A, 7B, and 7C illustrate a method of manufacturing the liquid crystal panel 10 in order of processes. First, as illustrated in FIG. 5A, the pixel circuit 13 is formed on the substrate 12 including, for example, silicon. On the pixel circuit substrate 11 that is formed in such a manner, a barrier film (unillustrated), the pixel electrode 16 including, for example, Al, and a sacrifice layer 51 including, for example, SiN that are formed separately for each of the pixels P are formed in this order using, for example, a sputtering method and a photolithography method, following which, for example, an $SiO_2$ film 17a is formed on the pixel circuit substrate 11, as illustrated in FIG. 5B. Next, a resist film 52 is formed as a mask in a predetermined region (here, at a central part of the pixel region 110) on the $SiO_2$ film 17a, as illustrated in FIG. 5C.

Thereafter, as illustrated in FIG. 6A, etching is performed for the $SiO_2$ film 17a on the outer side from the central part of the pixel region 110 using the photolithography method. Next, the $SiO_2$ film 17a at the central part of the pixel region 110 is polished using a CMP (Chemical Mechanical Polishing) method, as illustrated in FIG. 6B. At this occasion, the sacrifice layer 51 serves as a stopper layer. Thereafter, the $SiO_2$ film 17a is removed up to a desired thickness by etchback, as illustrated in FIG. 6C.

Thereafter, as illustrated in FIG. 7A, the sacrifice layer 51 is removed by the etchback. As a result, on the $SiO_2$ film 17a between the pixel electrodes 16, desired protruding and recessed shapes are formed on the basis of a selection ratio at the time of the etchback. Next, $SiO_2$ films are further formed on the $SiO_2$ films 17a on the pixel electrode 16 and between the pixel electrodes 16 using a high-density plasma chemical vapor deposition (HDP-CVD) method, as illustrated in FIG. 7B. Such a method of forming the $SiO_2$ films with use of the HDP-CVD method has a feature of superior embedding property because an oxide film ($SiO_2$ film) is formed while sputtering is performed. This allows the dielectric layer 17A that reflects the protruding and recessed shapes on a surface thereof to be formed.

Thereafter, as illustrated in FIG. 7C, the dielectric layer 17B including, for example, SiN is formed on the dielectric layer 17A. This leads to the formation of the sloped sections 41 whose slope widths W facing the pixel electrodes 16 are different from one another in the pixel region 110. After this, the alignment film 22, the liquid crystal layer 21, and the alignment film 23 are formed on the dielectric layer 17, and thereafter, the counter substrate 31 including the counter electrode 32 is attached to the alignment film 23 together.

Finally, the polarization plate 33 is attached to the surface S1 side of the counter substrate 31 together. Thus, the liquid crystal panel 10 of the present embodiment is completed.

It is to be noted that, as with the present embodiment, in a case where an orientation or a depth, or a height of recesses and protrusions of the dielectric layer 17 between the pixel electrodes 16 is changed, a thickness of the $SiO_2$ film 17a in a desired region (a peripheral region of the pixel region 110 from a peripheral part of the pixel region 110) is preferably reduced in advance by, for example, dry etching immediately before planarization prior to the etchback, as illustrated in FIG. 5C and FIG. 6A. In this manner, the recessed and protruding structures on a surface of the dielectric layer 17A differ between the central part and the peripheral part of the pixel region 110, as illustrated in FIG. 7B. Furthermore, adjusting the processing amount of the dry etching, or the polishing amount of the CMP makes it possible to cause the orientation of the protruding sections or the recessed sections formed on the dielectric layer 17 to differ between the central part and the peripheral part of the pixel region 110.

Furthermore, FIG. 1, FIG. 2, and the above-described manufacturing method exemplify a case in which the recessed and protruding structures are formed on the dielectric layer 17A serving as a lower layer, of the double-layered dielectric layer 17, and the recessed and protruding structures are formed on the surface of the dielectric layer 17 on the basis of such a configuration; however, the configuration is not limited to this case. For example, similarly to a liquid crystal panel 10C illustrated in FIG. 8, the recessed and protruding structures may be formed only on the dielectric layer 17B serving as an upper layer, of the double-layered dielectric layer 17.

1-3. Configuration of Projection Display Unit

FIG. 9 illustrates an example of a configuration of a projection display unit (a projection display unit 1) that includes the liquid crystal panel 10 of the present embodiment. The projection display unit 1 generates image light from a light source (a light source 131) to project an image onto a screen section 220 of a head-up display to be described later, for example. The projection display unit 1 is a reflective projector of a so-called single-panel method that performs color-image display with use of a single piece of a reflective light modulation element (a liquid crystal panel 154).

The projection display unit 1 has the light sources 131 each outputting white light, and includes an RGB division filter 151, a half mirror 152, a polarization plate 153, a liquid crystal panel 154, an aperture 155, and a projection lens 156 along an optical axis 130 of output light. The light source 131 includes, for example, a halogen lamp, a metal halide lamp, a xenon lamp, or the like. In addition, a solid-state light source such as a semiconductor laser (LD) or a light-emitting diode (LED) may be used for the light source 131, for example.

In the projection display unit 1, for example, white light (W) emitted from a light source 131R passes through the RGB division filter 151 that performs time division of the white light (W) into red light (R), green light (G), and blue light (B) to enter the half mirror 152, and a portion thereof is reflected to enter the liquid crystal panel 154 through the polarization plate 153. It is to be noted that a capacitor lens, or, on an as-needed basis, a relay lens, etc. are provided on an optical path of output light from the light source 131.

The light that enters the liquid crystal panel 154 is reflected on a reflective surface in the liquid crystal panel 154 to pass through the polarization plate 153 again and enter the half mirror 152, partially passing through the half mirror 152. The light passing through the half mirror 152 is subjected to cutting of unwanted light by the aperture 155, and projected in a magnified manner onto a screen (unillustrated) by the projection lens 156.

FIG. 10 illustrates another example of a configuration of a projection display unit (a projection display unit 2) that includes the liquid crystal panel 10 of the present embodiment. The projection display unit 2 generates image light by modulating light (illuminating light) outputted from a light source for each of RGB colors to synthesize the resulting light on the basis of an image signal, and projects an image onto the screen section 220 of the head-up display to be described later, for example. The projection display unit 2 is a reflective projector of a so-called three-panel method that performs color-image display with use of three reflective light modulation elements 141R, 141G, and 141B for red, green, and blue colors, respectively.

The projection display unit 2 includes the light source 131, an integrator 132, and a dichroic mirror 133 (a wavelength-selective element) along the optical axis 130. The light source 131 emits the white light including the red light (R), the blue light (B), and the green light (G) that are necessary for color-image display, and includes, for example, the halogen lamp, the metal halide lamp, the xenon lamp, or the like. In addition, the solid-state light source such as the semiconductor laser (LD) or the light-emitting diode (LED) may be used for the light source 131, for example. Further, the light source 131 is not limited to a single light source (a white light source section) that emits the white light as described above, and may include, for example, three kinds of light source sections of a green light source section emitting green-bandwidth light, a blue light source section emitting blue-bandwidth light, and a red light source section emitting red-bandwidth light. The integrator 132 includes a PS converter, etc., and is provided to make uniform and efficiently utilize light from the light source 131. The dichroic mirror 133 has a function to split the white light into the blue light B, as well as the remaining color light R and G.

The projection display unit 2 further includes a pre-PBS (polarization beam splitter) 134, a condensing lens 136, and a dichroic mirror 138 in light-travelling order on optical paths of the red light R and the green light G that are split by the dichroic mirror 133. In addition, the projection display unit 2 includes pre-PBSs 134 and 135, as well as a condensing lens 137 in light-travelling order on an optical path of the blue light B that is split by the dichroic mirror 133. The pre-PBS 135 has a function to selectively reflect light having a predetermined polarization component of incoming light. The dichroic mirror 138 has a function to split the red light R and the green light G that are entered through the pre-PBS 134 and the condensing lens 137.

It is to be noted that the pre-PBSs 134 and 135 may be disposed at any position in a region extending from the condensing lens 136 to condensing lenses 139R, 139G, and 139B, for example. In such a case, mirrors are disposed at positions of the pre-PBSs 134 and 135 that are illustrated in FIG. 10.

In the projection display unit 2, on the optical paths of the red light R, the green light G, and the blue light B, the condensing lenses 139R, 139G, and 139B, PBSs 140R, 140G, and 140B, quarter-wavelength plates 142R, 142G, and 142B, as well as light modulation elements 141R, 141G, and 141B are provided respectively in order from the light-incoming side.

Each of the light modulation elements 141R, 141G, and 141B includes the liquid crystal panel 10 (for example, the liquid crystal panel 10A or the liquid crystal panel 10B) of the present embodiment. Color light of a predetermined polarization component (for example, an S-polarization component) that is selected by polarization selective surfaces of the PBSs 140R, 140G, and 140B enters the light modulation elements 141R, 141G, and 141B, respectively. The light modulation elements 141R, 141G, and 141B modulate incoming light by controlling a polarization state to reflect the modulated light toward the PBSs 140R, 140G, and 140B, respectively.

Each of the PBSs 140R, 140G, and 140B has a polarization selective surface, and has a function to select (reflect), on the polarization selective surface, light of a predetermined polarization component (an S-polarization component) that is caused to enter the light modulation elements 141R, 141G, and 141B, respectively, as well as to select (allow for passing-through of) light of a predetermined polarization component (a P-polarization component) of the light reflected by the light modulation elements 141R, 141G, and 141B, respectively as light for image display, thereby outputting such light. It is to be noted that an example in FIG. 10 illustrates an optical configuration in which light of the S-polarization component is reflected in the PBSs 140R, 140G, and 140B to use such reflected light as light incoming into the light modulation elements 141R, 141G, and 141B, respectively, and light of the P-polarization component of return light from the light modulation elements 141R, 141G, and 141B is passed through as output light. On the contrary, it is also possible to employ a configuration in which incoming light of the P-polarization component is caused to enter the light modulation elements 141R, 141G, and 141B from the front sides thereof, and a ray of light of the S-polarization component that is selected by reflection in the light modulation elements 141R, 141G, and 141B of the return light from these light modulation elements is used as the light for image display.

The quarter-wavelength plates 142R, 142G, and 142B correct the polarization state between the PBSs 140R, 140G, and 140B, and the light modulation elements 141R, 141G, and 141B, respectively, and generate a phase difference of nearly a quarter wavelength for light of polarization components orthogonal to each other.

Further, the projection display unit 2 includes a cross dichroic prism 144, a projection lens 145, and a screen 146. The cross dichroic prism 144 has a function to synthesize and output color light of predetermined polarization components that are selected by the PBSs 140R, 140G, and 140B. The cross dichroic prism 144 has three incoming surfaces and a single outgoing surface.

Between the light incoming surfaces in the cross dichroic prism 144 and the light outgoing surfaces of the PBSs 140R, 140G, and 140B, spacers 143R, 143G, and 143B are provided in order to prevent a stress distortion due to temperature variation, etc. of these optical elements. It is to be noted that a polarization beam splitter (PBS) or a dichroic prism may be disposed at the positions of the spacers 143R, 143G, and 143B. Polarization leakage is cut by disposing the PBS. Further, it is possible to reflect light of an unintended wavelength by disposing the dichroic prism.

The projection lens 145 is disposed on the outgoing surface side of the cross dichroic prism 144. The projection lens 145 has a function of projecting synthesized light outgoing from the cross dichroic prism 144 toward the screen 146.

1-4. Workings and Effects

As described previously, in a projection liquid crystal projector including a reflective liquid crystal display, light to be projected has a path in which the light passes through a glass substrate with a transparent electrode disposed on a substrate, a liquid crystal layer, an alignment film, and a dielectric layer in this order, and is reflected by a pixel electrode. Therefore, the intensity of light of an image to be projected tends to depend on the above-described structures, and especially it is demanded to keep constant a distance (a gap length) between the transparent electrode and the pixel electrode on the glass substrate.

For the distance between the transparent electrode and the pixel electrode on the glass substrate, liquid crystal molecules that mainly configure the liquid crystal layer expand in length, for example, due to variation in environmental temperature, as described previously. This leads to variation in the gap length.

For example, FIG. 11 illustrates a cross-sectional configuration of a typical liquid crystal panel 1010. As with the liquid crystal panel of the present embodiment, the liquid crystal panel 1010 has a configuration in which pixel electrodes 1016 having light reflectivity, a dielectric layer 1017, a liquid crystal layer 1021 that is interposed between alignment films 1022 and 1023, and is sealed with sealing materials 1024, as well as a counter substrate 1031 with a counter electrode 1032 and a polarization plate 1033 disposed thereon are laminated on a pixel circuit substrate 1011. In such a liquid crystal panel 1010, a thickness of the liquid crystal layer 1021 is constant at the manufacturing time, as illustrated in FIG. 11. However, when the environmental temperature rises, for example, up to about 60° C. upon use, the liquid crystal molecules expand, and resultingly a thickness D2 at a central part of the liquid crystal layer 1021 becomes greater than a thickness D1 at a peripheral edge thereof (D2>D1), as illustrated in FIG. 12.

Generally, a direct-view liquid crystal display keeps the gap length constant by providing a spacer in a display region. In contrast, in a projection liquid crystal display, a size of a pixel electrode is as small as, for example, 10 μm per side as compared with that of the direct-view liquid crystal display, and therefore provision of the spacer has more influence on light to be projected. Further, in the projection liquid crystal display, because more intense light is emitted to project an image, the gap length tends to vary, as compared with the direct-view liquid crystal display. Accordingly, as a method without the spacer, for example, a method of adjusting the gap length by forming a recessed section having the periphery of a pixel region as an edge thereof on a substrate side, etc. has been developed.

The above-described method is an effective method because such a method makes it possible to provide an adjustment margin of the gap length without being affected by a process of forming pixel electrodes as long as the panel size is not so small. However, in a liquid crystal display with a small panel size like LCOS, it is difficult to adopt such a method. This is because, in the liquid crystal display with a small panel size, as the panel size becomes smaller, a change rate of curvature in a pixel region due to expansion of liquid crystal molecules increases, and furthermore, an influence from a process of forming pixel electrodes becomes more significant. Therefore, even in a small-sized liquid crystal display like the LCOS to be used in the projection liquid crystal projector, a configuration is demanded that makes it possible to make the amount of light in the pixel region uniform.

In contrast, in the liquid crystal panel 10 of the present embodiment, shapes of the respective dielectric layers 17 between the adjoining pixel electrodes 16 in the pixel region 110 are different from one another, or such dielectric layers 17 are configured to be different from one another in height or depth even though the shapes are the same one another. Specifically, like the liquid crystal panels 10A and 10B illustrated in FIG. 1, FIG. 2, etc., the plurality of sloped sections 41 having the sloped surfaces S2 on the respective pixel electrodes 16 are provided on the dielectric layer 17, and further the widths (the slope widths W) of the sloped surfaces S2 facing the pixel electrodes 16 are configured to be different from one another in the pixel region 110. This allows for adjustment of the optical reflectance in each of the pixel electrodes 16. Therefore, it is possible to change the optical reflectance in a desired region in the pixel region 110 and to make the amount of light in the pixel region 110 uniform.

2. Modification Examples

Next, description is given of modification examples (modification examples 1 to 3) of the liquid crystal panel 10 of the above-described embodiment. It is to be noted that components that are similar to those of the liquid crystal panel 10 according to the above-described embodiment are denoted with the same reference numerals, and the related descriptions are omitted as appropriate.

2-1. Modification Example 1

FIGS. 13A, 13B, 13C, 14A, 14B, 14C, 15A, and 15B illustrate a method of manufacturing the liquid crystal panel 10 in order of processes, and are cross-sectional views to explain another method of manufacturing the liquid crystal panel 10 described in the above-described embodiment. It is also possible to manufacture the liquid crystal panel 10 of the present disclosure in a method of the present modification example.

First, as illustrated in FIG. 13A, on the pixel circuit substrate 11, the barrier film (unillustrated) and the pixel electrode 16 including, for example, Al are formed in this order for each of the pixels P using, for example, the sputtering method and the photolithography method, following which, for example, the $SiO_2$ film 17a is formed on the pixel circuit substrate 11. Thereafter, the $SiO_2$ film 17a is polished to planarize a surface thereof using, for example, the CMP method, as illustrated in FIG. 13B. Next, a resist film 53 is formed at a desired position (here, a position between the pixel electrodes 16), as illustrated in FIG. 13C.

Thereafter, as illustrated in FIG. 14A, etching is performed for the $SiO_2$ film 17a using the photolithography method, following which the resist film 53 is removed. At this occasion, etching is stopped inside the $SiO_2$ film 17a. Next, the $SiO_2$ film 17a is removed up to a desired thickness (for example, until the pixel electrodes 16 are exposed) using, for example, the etchback, as illustrated in FIG. 14B. Thereafter, the $SiO_2$ film 17a remaining between the pixel electrodes 16 is processed using, for example, a reverse sputtering method or an isotropic etching with use of low-bias etching at the time of DET etching, as illustrated in FIG. 14C.

Next, as illustrated in FIG. 15A, the $SiO_2$ film 17a is formed on the pixel electrode 16 using the HDP-CVD method to form the dielectric layer 17A. Thereafter, the dielectric layer B including, for example, SiN is formed on the dielectric layer 17A using, for example, the CVD method, as illustrated in FIG. 15B. After this, the alignment film 22, the liquid crystal film 21, and the alignment film 23 are formed on the dielectric layer 17, following which the counter substrate 31 including the counter electrode 32 is attached to the liquid crystal layer 21 together. Finally, the polarization plate 33 is attached to the surface S1 side of the counter substrate 31 together. Thus, the liquid crystal panel 10 of the present disclosure is completed.

It is to be noted that the above-described embodiment and modification example exemplify a case in which, on the flat pixel circuit substrate 11, differences in levels are formed between a central part and a peripheral part of the pixel region 110 using an $SiO_2$ film, etc., and the dielectric layer 17 that differs in film thickness at the central part and the peripheral part of the pixel region 110 is formed by polishing with use of the CMP, etc.; however, the configuration is not limited to such a case. In an actual device, many wiring layers are stacked on the pixel circuit substrate 11, and an insulating film (an inter-wiring-layer film) is formed between the wiring layers of the respective layers, resulting in the formation of irregularities on the surface. Typically, polishing, etc. is performed to planarize the irregularities; however, at this occasion, the polishing amount varies depending on wiring density. In this way, on the surface of the pixel circuit substrate 11, for example, the central part of the pixel region 110 may take a protruding shape, and the peripheral part may take a recessed shape. In a case where there is a difference in level on the surface of the pixel circuit substrate 11, polishing with a higher planarizing capability makes it possible to form the dielectric layer 17 that differs in film thickness between the pixel electrodes 19 at the central part and the peripheral part of the pixel region 110 without forming the difference in level using the $SiO_2$ film 17a as described above.

As mentioned above, in the above-described embodiment, the recessed section 42 or the protruding section 43 is formed between the adjoining pixel electrodes 16 by providing the sacrifice layer 51 on the pixel electrode 16; however, it is possible to form the recessed section 42 or the protruding section 43 between the adjoining pixel electrodes 16 without providing the sacrifice layer 51, as in the present modification example. Specifically, in the present modification example, the protruding section 43 is formed between the pixel electrodes 16 by performing etching of the $SiO_2$ film 17a on the pixel electrode 16 after planarization of the $SiO_2$ film 17a. It is to be noted that, in such a method, it is possible to change the slope width W of the dielectric layer 17 to be formed on the pixel electrode 16 by changing an etching width at the central part and the peripheral part of the pixel region 110 at the time of etching of the $SiO_2$ film 17a on the pixel electrode 16.

2-2. Modification Example 2

FIG. 16A illustrates an example of planar shapes of the plurality of pixel electrodes 16 that are provided in the liquid crystal panel 10 according to a modification example of the present disclosure. In the present modification example, the sloped sections 41 are formed on a surface of the dielectric layer 17 by processing the planar shapes of the pixel electrodes 16.

Like the above-described embodiment, the amount of light in the pixel region 110 is controlled in such a manner that the sloped sections 41 are formed on a surface of the dielectric layer 17 by changing a thickness of the dielectric layer 17 on the pixel electrodes 16, thereby varying the optical reflectance of the pixel electrodes 16. As an alternative, it is also possible to control the amount of light in the pixel region 110 by changing a layout of the pixel electrodes 16 that are two-dimensionally arrayed (for example, Bayer-arrayed). As one of these methods, for example, it is considered to change the area of the pixel electrode 16. However, simple reduction in the area of the pixel electrode 16 causes an increase in a distance between the pixel electrodes 16, leading to emphasis of dots appearance. Further, an attempt to keep a distance between the pixel electrodes 16 constant causes distortion, etc. in an image to be projected.

In contrast, in the present modification example, in a region where a decrease in the amount of light is desired inside the pixel region 110 in which the plurality of pixel electrodes 16 are arrayed, the pixel electrodes 16 each having notches 16X with four rectangular corners cut out are disposed, as illustrated in FIG. 16A, for example. This makes it possible to form the sloped sections 41 on a surface of the dielectric layer 17 without processing the dielectric layer 17 separately.

It is to be noted that a shape of the notch 16X is not limited to the shape with four corners cut out completely as illustrated in FIG. 16A. As an alternative, like notches 16X1 and 16X2 as illustrated in FIG. 16B and FIG. 16C, respectively, tapered surfaces S3 may be formed at four corners. Further, these notches 16X1 and 16X2 may be not only formed at four corners of the pixel electrode 16, but also formed continuously at an end of the pixel electrode 16.

It is to be noted that the optical reflectance of the respective pixel electrodes 16 is controllable by changing a size of the notch 16X, an angle of the tapered surface S3, or a width (Wx) of the tapered surface in the pixel region 110. Further, in the present modification example, the pixel electrode 16 takes a rectangular shape; however, the shape is not limited to such a form. The same is true for a case where the pixel electrode 16 takes, for example, a triangular shape, a hexagonal shape, etc.

2-3. Modification Example 3

FIG. 17A illustrates another example of planar shapes of the plurality of pixel electrodes 16 that are provided in the liquid crystal panel 10 according to a modification example of the present disclosure. In the present modification example, irregular structures serving as the sloped sections 41 are formed on a surface of the dielectric layer 17 by forming a protruding section 16H1 (FIG. 17B) or a recessed section 16H2 (FIG. 17C) in a plane of the pixel electrode 16.

The protruding section 16H1 or the recessed section 16H2 in a plane of the pixel electrode 16 is provided by forming an irregular structure at the bottom of the pixel electrode 16. It is possible to form such an irregular structure by devising processing of a via V15 that electrically couples the pixel circuit 13 and the pixel electrode 16 with each other, for example. The via V15 is formed by embedding, for example, tungsten (W) into an insulating layer 14 using, for example, the etchback or the CMP method. The via V15 is generally planarized by polishing a portion projecting finally out of the insulating layer 14 using, for example, the CMP method, etc. Therefore, it is possible to form the protruding section 16H1 or the recessed section 16H2 on a surface of the pixel electrode 16 by changing the polishing amount in the pixel region 110. In other words, by decreasing the polishing amount, and by achieving a state where a portion of the via V15 projects out of a surface of the insulating layer 14 as illustrated in FIG. 17B, the protruding section 16H1 is formed at a position of the pixel electrode 16 corresponding to the via V15. Further, by increasing the polishing amount, and by achieving a state where a top surface of the via V15 is recessed below the surface of the insulating layer 14 as illustrated in FIG. 17C, the recessed section H2 is formed at a position of the pixel electrode 16 corresponding to the via V15.

It is to be noted that an example of a method of changing the amount of projection of the via V15 from the insulating layer 14 includes a method of changing a diameter of the via V15 between the central part and the peripheral part of the pixel region 110. In a case of using such a method, it is preferable to perform overetching sufficiently since detaching property varies during processing of the via V15.

As described above, by changing, in the pixel region 110, planar shapes and cross-sectional shapes of the plurality of pixel electrodes 16 that are provided in the liquid crystal panel 10, it is also possible to form the sloped sections 41 that differ from one another in the pixel region 110 on the surface of the dielectric layer 17. This allows the effects similar to those of the above-described embodiment to be obtained.

3. Application Examples

The projection display units 1 and 2 each including the liquid crystal panel 10 of the present disclosure is applicable to, for example, a wearable display such as a head-up display, or a carriageable portable display, or any type of electronic apparatuses having a projection function as described above, such as a smartphone and a tablet. As an example, description is given of general configurations of a head-up display 3 (FIG. 18) and a head-mounted display (FIG. 19).

Application Example 1

FIG. 18 illustrates an external appearance of a head-up display 3. The head-up display 3 reflects information directly in a field of view of a user, and makes it possible to display navigation information, etc. without obstructing the view in front by mounting it to a vehicle, etc. The head-up display 3 has, for example, a light output section 210, a screen section 220, and a concave-surface half mirror 230.

Application Example 2

FIG. 19 illustrates an external appearance of a head-mounted display 4 according to an application example 3. The head-mounted display 4 includes a display section 310, a mounting section 320, and a projection section 330. The projection display unit 1 (or the projection display unit 2) of the present disclosure is mounted to the projection section 330, for example.

The present disclosure is described thus far with reference to the embodiment and modification examples thereof; however, the present disclosure is not limited to the embodiment, etc., but various modifications may be made. For example, the projection display unit of the present disclosure is not limited to that of the configuration described in the above-described embodiment, and is applicable to various types of display units that modulate light from a light source through a liquid crystal display unit to perform image display using a projection lens.

Further, the liquid crystal panel 10 of the present disclosure not only combines each of the above-described modification example 1 and modification example 2 with the above-described embodiment, but also may be configured to combine the modification example 1 and the modification example 2.

It is to be noted that the present disclosure may be configured as follows.

(1)
A liquid crystal display unit including:
a liquid crystal panel having a pixel region including a plurality of pixels,
the liquid crystal panel including
a first substrate on which a plurality of pixel electrodes having light reflectivity are provided for each of the pixels,
a second substrate disposed in opposition to the first substrate,
a liquid crystal layer disposed between the first substrate and the second substrate, and
an interlayer film provided between the first substrate and the liquid crystal layer, the interlayer film having a plurality of sloped sections each including at least a portion facing a corresponding one of the plurality of pixel electrodes, the plurality of sloped sections each having a slope width that faces the corresponding one of the plurality of pixel electrodes and that differs from one another.

(2)
The liquid crystal display unit according to (1), in which each of the slope widths of the plurality of sloped sections varies from a central part toward a peripheral part of the pixel region.

(3)
The liquid crystal display unit according to (1) or (2), in which shapes of the plurality of sloped sections vary from a central part toward a peripheral part of the pixel region.

(4)
The liquid crystal display unit according to any one of (1) to (3), in which the plurality of sloped sections have respective sloped surfaces, and total lengths of the respective sloped surfaces are different from one another.

(5)
The liquid crystal display unit according to any one of (1) to (4), in which the plurality of sloped sections have respective sloped surfaces, and tilt angles of the respective sloped surfaces are different from one another.

(6)
The liquid crystal display unit according to any one of (1) to (5), in which the interlayer film has a protruding section or a recessed section between the plurality of adjoining pixel electrodes.

(7)
The liquid crystal display unit according to (6), in which the protruding section and the recessed section are formed using sloped surfaces between the plurality of adjoining sloped sections as side surfaces.

(8)
The liquid crystal display unit according to any one of (1) to (7), in which the plurality of pixel electrodes have planar shapes or cross-sectional shapes that are different from one another.

(9)
The liquid crystal display unit according to any one of (1) to (8), in which one or more pixel electrodes of the plurality of pixel electrodes have a notch at one or more portions of an end.

(10)
The liquid crystal display unit according to any one of (1) to (9), in which one or more pixel electrodes of the plurality of pixel electrodes have a tapered surface at one or more portions of an end.

(11)

The liquid crystal display unit according to any one of (1) to (10), in which the pixel electrode has a recessed section or a protruding section in a plane.

(12)

A projection display unit including:

a light source;

a liquid crystal panel including a pixel region that allows light from the light source to be modulated and light corresponding to an image to be outputted; and a projection lens that projects the image on the basis of output light of the liquid crystal panel, the liquid crystal panel including a first substrate on which a plurality of pixel electrodes having light reflectivity are provided for each of the pixels, a second substrate disposed in opposition to the first substrate, a liquid crystal layer disposed between the first substrate and the second substrate, and an interlayer film provided between the first substrate and the liquid crystal layer, the interlayer film having a plurality of sloped sections each including at least a portion facing a corresponding one of the plurality of pixel electrodes, the plurality of sloped sections each having a slope width that faces the corresponding one of the plurality of pixel electrodes and that differs from one another.

This application claims the priority on the basis of Japanese Patent Application No. 2016-205218 filed on Oct. 19, 2016 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A liquid crystal display unit, comprising:
a liquid crystal panel, wherein the liquid crystal panel includes:
a pixel region that includes a plurality of pixels;
a first substrate;
a plurality of pixel electrodes on the first substrate, wherein
each of the plurality of pixel electrodes corresponds to a respective pixel of the plurality of pixels, and
each pixel electrode of the plurality of pixel electrodes has reflectivity;
a second substrate opposite to the first substrate;
a liquid crystal layer between the first substrate and the second substrate;
an interlayer film between the first substrate and the liquid crystal layer, wherein the interlayer film is on the plurality of pixel electrodes; and
an alignment film different from the interlayer film, wherein
the alignment film is between the interlayer film and the liquid crystal layer,
the interlayer film comprises a plurality of sloped sections,
each of the plurality of sloped sections includes at least a portion that faces a corresponding one of the plurality of pixel electrodes, and
a slope width of each of the plurality of sloped sections is different.

2. The liquid crystal display unit according to claim 1, wherein the slope width of each of the plurality of sloped sections varies from a center of the pixel region toward a periphery of the pixel region.

3. The liquid crystal display unit according to claim 1, wherein a shape of each of the plurality of sloped sections varies from a center of the pixel region toward a periphery of the pixel region.

4. The liquid crystal display unit according to claim 1, wherein
each of the plurality of sloped sections comprises a respective sloped surface, and
a length of the respective sloped surface of each the plurality of sloped sections is different.

5. The liquid crystal display unit according to claim 1, wherein
each of the plurality of sloped sections comprises a respective sloped surface, and
a tilt angle of the respective sloped surface of each of plurality of sloped sections is different.

6. The liquid crystal display unit according to claim 1, wherein the interlayer film has one of a protruding section or a recessed section between adjoining pixel electrodes of the plurality of pixel electrodes.

7. The liquid crystal display unit according to claim 1, wherein
a shape of each of the plurality of pixel electrodes is one of a planar shape or a cross-sectional shape, and
the shape of each of the plurality of pixel electrodes is different.

8. The liquid crystal display unit according to claim 1, wherein at least one pixel electrode of the plurality of pixel electrodes comprises a notch.

9. The liquid crystal display unit according to claim 1, wherein at least one pixel electrode of the plurality of pixel electrodes has a tapered surface.

10. The liquid crystal display unit according to claim 1, wherein each of the plurality of pixel electrodes has one of a recessed section or a protruding section in a plane of a respective pixel electrode of the plurality of pixel electrodes.

11. The liquid crystal display unit according to claim 1, wherein the interlayer film includes a dielectric material.

12. The liquid crystal display unit according to claim 1, wherein the alignment film includes a polyamide material.

13. A projection display unit, comprising:
a light source;
a liquid crystal panel that includes a pixel region, wherein
the pixel region includes a plurality of pixels, and
the liquid crystal panel is configured to:
control light from the light source to be modulated, and
output light corresponding to an image to be outputted; and
a projection lens configured to project the image based on the light corresponding to the image,
the liquid crystal panel further includes including:
a first substrate;
a plurality of pixel electrodes on the first substrate, wherein
each of the plurality of pixel electrodes corresponds to a respective pixel of the plurality of pixels, and
each pixel electrode of the plurality of pixel electrodes has reflectivity;
a second substrate opposite to the first substrate;
a liquid crystal layer between the first substrate and the second substrate1;
an interlayer film between the first substrate and the liquid crystal layer, wherein the interlayer film is on the plurality of pixel electrodes; and an alignment film different from the interlayer film, wherein the alignment film is between the interlayer film and the liquid crystal layer, the interlayer film comprises a plurality of sloped sections, each of the plurality of sloped sections includes at least a portion that faces a corresponding one of the plurality of pixel electrodes, and a slope width of each of the plurality of sloped sections is different.

* * * * *